(12) United States Patent
Wada et al.

(10) Patent No.: US 7,333,185 B2
(45) Date of Patent: Feb. 19, 2008

(54) OPTICAL VELOCIMETER, DISPLACEMENT INFORMATION MEASUREMENT DEVICE AND CONVEYING AND PROCESSING DEVICE

(75) Inventors: Hideo Wada, Nara (JP); Hisakazu Sugiyama, Takarazuka (JP); Takayuki Taminaga, Nara (JP); Hajime Kashida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 386 days.

(21) Appl. No.: 10/929,426

(22) Filed: Aug. 31, 2004

(65) Prior Publication Data
US 2005/0046824 A1 Mar. 3, 2005

(30) Foreign Application Priority Data
Sep. 2, 2003 (JP) ............................. 2003-310681

(51) Int. Cl.
*G01P 3/36* (2006.01)
(52) U.S. Cl. ........................................ 356/28; 342/105
(58) Field of Classification Search .......... 356/27–28.5
See application file for complete search history.

(56) References Cited

U.S. PATENT DOCUMENTS

| | | | | |
|---|---|---|---|---|
| 3,897,152 A | * | 7/1975 | Farmer et al. ................. | 356/28 |
| 4,320,765 A | * | 3/1982 | Cathignol et al. ........... | 600/455 |
| 4,506,979 A | * | 3/1985 | Rogers ....................... | 356/28.5 |
| 4,697,922 A | * | 10/1987 | Gunter et al. ............... | 356/28.5 |
| 5,148,229 A | * | 9/1992 | Wiseall ....................... | 356/28.5 |
| 5,212,535 A | * | 5/1993 | Miyazaki et al. ............. | 356/28 |
| 5,256,885 A | * | 10/1993 | Takamiya et al. ...... | 250/559.32 |
| 5,640,239 A | * | 6/1997 | Takamiya et al. ........... | 356/486 |
| 5,642,194 A | * | 6/1997 | Erskine ....................... | 356/497 |
| 6,185,167 B1 | * | 2/2001 | Arai et al. ................. | 369/44.23 |
| 6,222,865 B1 | * | 4/2001 | Stoltz et al. ............. | 372/46.01 |

(Continued)

FOREIGN PATENT DOCUMENTS

JP 61-065116 4/1986

(Continued)

OTHER PUBLICATIONS

S. Shinohara et al., in "Laser Doppler velocimeter using the self-mixing effect of a semiconductor laser diode," Applied Optics, vol. 25, No. 9, p. 1417-1419, May 1986.*

(Continued)

*Primary Examiner*—Thomas H. Tarcza
*Assistant Examiner*—Timothy Brainard
(74) *Attorney, Agent, or Firm*—Nixon & Vanderhye, PC

(57) ABSTRACT

There is provided an optical velocimeter for achieving miniaturization and lower power consumption thereof and for accurately detecting two-dimensional travel velocity of a measured object. This optical velocimeter includes a light-emitting element, a diffraction grating, two light-receiving sections, and a signal processing circuit. Light emitted from the light-emitting element is branched by the diffraction grating into three light fluxes, and optical axes of the divided light fluxes are intersected one another on the measured object to form one detection point. Scattered light from the detection point frequency-shifted by travel of the measured object is then received by the two light-receiving sections, and a light-reception signals outputted from the light-receiving sections are processed in the signal processing circuit to detect travel velocities of two directions of the measured object.

11 Claims, 17 Drawing Sheets

U.S. PATENT DOCUMENTS

| | | | |
|---|---|---|---|
| 6,659,639 B2 * | 12/2003 | Hollander et al. | 374/121 |
| 2005/0036122 A1 * | 2/2005 | Nomura et al. | 355/53 |
| 2005/0274145 A1 * | 12/2005 | Aitken et al. | 65/64 |

FOREIGN PATENT DOCUMENTS

| | | |
|---|---|---|
| JP | 62-043569 | 2/1987 |
| JP | 3-235060 | 10/1991 |
| JP | 04/027869 | 1/1992 |
| JP | 4-204104 | 7/1992 |
| JP | 06-160117 | 6/1994 |
| JP | 8-15435 | 1/1996 |
| JP | 2002-054987 | 2/2002 |

OTHER PUBLICATIONS

Yeh and Cummins, "Localized Fluid Flow Measurements with an He-Ne Laser Spectrometer" Applied Physics Letter vol. 4, No. 10, May 15, 1964, pp. 176-178.

* cited by examiner

TO BEAM SPOT (DETECTION POINT)
(ORIGIN IN COORDINATE SYSTEM)

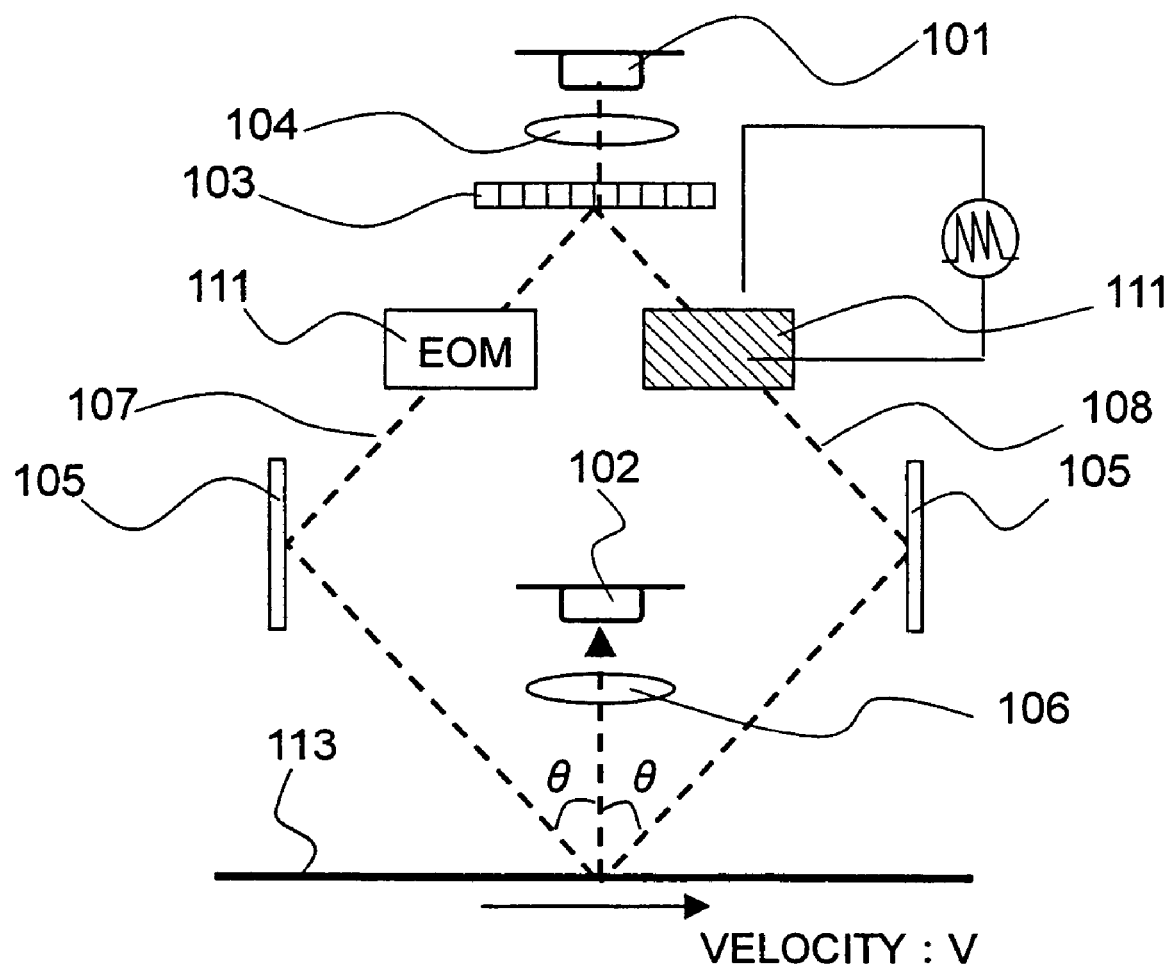

OPTICAL VELOCIMETER, DISPLACEMENT INFORMATION MEASUREMENT DEVICE AND CONVEYING AND PROCESSING DEVICE

BACKGROUND OF THE INVENTION

This nonprovisional application claims priority under 35 U.S.C. §119(a) on Patent Application No. 2003-310681 filed in Japan on Sep. 2, 2003, the entire contents of which are hereby incorporated by reference.

The present invention relates to a velocimeter which irradiates laser light onto a traveling measured object and receives scattered light of an optical frequency shift quantity corresponding to the travel velocity of the measured object from the measured object to detect the velocity of the measured object, a displacement information measurement device which calculates displacement information of the measured object based on velocity information and time information of the measured object, and a conveying and processing device which controls conveying of the measured object based on the velocity information or displacement information and applies a prescribed process to the measured object.

When a light source and an observer move relative to each other, light is generally subjected to frequency changes by the Doppler effect. The laser Doppler velocimeter (hereinafter, referred to as LDV) uses this effect to measure a speed of a measured object by irradiating laser light onto the moving object and measuring a Doppler frequency shift of the scattered light from the measured object. This laser Doppler velocimeter, which was disclosed by Yeh and Cummins in 1964 (Appl. Phys. Lett. 4-10 (1964) 176), is widely known and is in practical use today.

FIG. 13 shows an optical system view of a conventionally typical LDV.

In FIG. 13, reference numeral 101 denotes a laser diode (hereinafter, referred to as LD) as a semiconductor laser, 102 denotes a photodiode as a photodetector (hereinafter, referred to as PD), 103 denotes a diffraction grating, 104 denotes a collimator lens (hereinafter, referred to as CL), 105 denotes a mirror, 106 denotes a condenser lens, 107 denotes a first light flux of +1st order diffracted light by the diffraction grating 103, 108 denotes a second light flux of −1st order diffracted light by the diffraction grating 103, and 113 denotes a measured object.

In the optical system as constituted above, laser light emitted from the LD 101 is converted by the CL 104 into a parallel light flux, and then is split into ±1st order diffracted lights at a diffraction angle of θ by the diffraction grating 103 to become the first light flux 107 and the second light flux 108. The first light flux 107 and the second light flux 108 are respectively reflected by the mirrors 105 and are then made incident on a surface of the measured object 113 at an incident angle of θ to be overlapped each other again. The first light flux 107 and the second light flux 108 scattered by the measured object 113, which are Doppler frequency-shifted, are slightly different from the LD 101 in oscillating frequency. As a result, the interfacial waves of the first light flux 107 and the second light flux 108 scattered by the measured object 113 generate beat. This beat is termed beat signal. The speed of the measured object 113 is obtained by heterodyne-detecting a beat frequency of the beat signal using the PD 102. Hereinafter, this will be explained in further detail.

Here, when a direction in which the measured object 113 moves to the right as shown in FIG. 13 is set as a forward (positive) direction, the frequency shift of the first light flux 107 is Doppler frequency-shifted by $-f_d$ and the second light flux 108 is Doppler frequency-shifted by $+f_d$, so that an apparent frequency of the first light flux 107 becomes $(f_0-f_d)$ and an apparent frequency of the second light flux 108 becomes $(f_0+f_d)$. Note that $f_0$ represents the oscillating frequency of the LD 101. In this case, since an electric field of the light emitted from the LD 101 is represented as $E_0 \cdot \cos(2\pi f_0 t)$ wherein $E_0$ denotes an amplitude thereof and t denotes time, the first light flux 107 is indicated by the following Equation (1) and the second light flux 108 by the following Equation (2):

$$I_A = E_A \cdot \cos\{2\pi(f_0-f_d)t+\phi_A\} \quad (1)$$

$$I_B = E_B \cdot \cos\{2\pi(f_0+f_d)t+\phi_B\} \quad (2)$$

wherein $f_0$ denotes a frequency of a beam outgoing from the LD 101, $E_0$ denotes an amplitude of the beam outgoing from the LD 101, $E_A$ denotes an amplitude of the first light flux 107, $E_B$ denotes an amplitude of the second light flux 108, $\phi_A$ denotes a phase of the first light flux 107 and $\phi_B$ denotes a phase of the second light flux 108.

Since the frequency of light is generally 100 THz (up to $10^{14}$ Hz), it is impossible to measure the frequency information of Equation (1) and Equation (2) directly. Therefore, a heterodyne detection is generally employed, and since $f_0 \gg f_d$ is established, an interfacial wave of Equation (1) and Equation (2) is indicated by the following equation:

$$\langle |I_A + I_B|^2 \rangle = \frac{E_A^2 + E_B^2}{2} + E_A \cdot E_B \cdot \cos(2\pi(2f_d)t - (\phi_A - \phi_B)) \quad (3)$$

Note that < > in the left side of Equation (3) represents time average. Consequently, the PD 102 allows the frequency of the interfacial wave to be measured.

FIG. 14 shows a case when as the measured object 113 moves at a speed of V, two light fluxes are made incident on the object 113 at arbitrary angles of α and β respectively, and an observer receives scattered light at an arbitrary angle of Y.

Frequency shift quantity due to the Doppler effect, which is obtained using the Lorentz transformation based on relativism in a precise sense, is approximately obtained as follows when the moving speed V is sufficiently smaller than speed of light c. Relative velocities $V_{A1}$ and $V_{B1}$ of the moving object 113 with respect to lights from light sources A and B are indicated by the following equations:

$$V_{A1} = c - V\sin\alpha$$

$$V_{B1} = c + V\sin\beta \quad (4)$$

Also, apparent frequencies $f_{A1}$ and $f_{B1}$ of the respective lights seen from the measured object 113 are indicated by the following equations:

$$f_{A1} = \frac{V_{A1}}{\lambda} = \frac{1}{\lambda} \cdot (c - V\sin\alpha) \quad (5)$$

$$f_{B1} = \frac{V_{B1}}{\lambda} = \frac{1}{\lambda} \cdot (c + V\sin\beta)$$

Relative velocities $V_{A2}$ and $V_{B2}$ of the respective scattered (reflected) lights and the measured object 113 are indicated by the following equations:

$$V_{A2} = c - V \sin \gamma$$

$$V_{B2} = c - V \sin \gamma \quad (6)$$

Consequently, frequencies $f_{A2}$ and $f_{B2}$ of lights seen from the observation point are indicated by the following equations:

$$f_{A2} = \frac{c}{V_{A2}} \cdot f_{A1} = \frac{c}{\lambda} \cdot \frac{1 - \frac{V}{c} \cdot \sin\alpha}{1 - \frac{V}{c} \cdot \sin\gamma} \quad (7)$$

$$f_{B2} = \frac{c}{V_{B2}} \cdot f_{B1} = \frac{c}{\lambda} \cdot \frac{1 + \frac{V}{c} \cdot \sin\beta}{1 - \frac{V}{c} \cdot \sin\gamma}$$

The difference between the frequency in Equation (7) and the frequency of incident light ($f_0$) becomes a Doppler frequency shift quantity $f_d$. Here, the beat frequency of the two light fluxes measured at the observation point $2f_d$ is indicated by the following equation using $c \gg V$:

$$2f_d = |f_{B2} - f_{A1}| \quad (8)$$

$$= \frac{V}{\lambda} \cdot (\sin\alpha + \sin\beta)$$

It can be seen that $2f_d$ is independent of a position of the observation point (angle: Y). In FIG. 13, in which $\alpha = \beta = \theta$ is valid, the following equation is established based on Equation (8) in the typical optical system of the LDV of FIG. 13:

$$2f_d = \frac{2V}{\lambda} \cdot \sin\theta \quad (9)$$

Accordingly, the speed V of the measured object 113 is obtained by measuring the frequency $f_d$ indicated in Equation (3) and calculating using Equation (9).

It is also possible to interpret Equation (9) geometrically as follows: FIG. 15 is an enlarged view of an area in which the two light fluxes in FIG. 13 (the first and second light fluxes 107 and 108) intersect each other. The two light fluxes have an incident angle $\theta$ respectively and intersect each other, and the broken lines in FIG. 15 show parts of equal wave surfaces of the respective light fluxes. An interval between the broken lines shows the wavelength of light $\lambda$. Vertical thick lines show the bright parts of interference fringes, and when the interval between the vertical thick lines is set as $\Delta$, this $\Delta$ is indicated by the following Equation (10):

$$\Delta = \frac{\lambda}{2\sin\theta} \quad (10)$$

As shown in FIG. 15, when an object (shown as •) passes perpendicularly to the interference fringes at a velocity of V, a frequency f of the interference fringes is indicated by the following equation:

$$f = \frac{V}{\Delta} = \frac{2V}{\lambda} \cdot \sin\theta = 2f_d \quad (11)$$

This equation is equal to Equation (9). This concept is called the interference fringe model.

The speed V of a measured object is thus obtained in a typical LDV. However, it is impossible to detect the moving direction of a measured object. On the other hand, detecting a moving direction is made possible by rotating the diffraction grating 103 in FIG. 13 at a velocity of $V_g$ according to JP 03-235060 A. In this case, when light is reflected by the diffraction grating 103, since the respective light fluxes are Doppler frequency-shifted in proportion to $V_g$, the beat frequency $2f_d$ to be measured in the PD 102 is obtained by the following equation:

$$2f_d = \frac{2V}{\lambda} \cdot (V + V_g) \cdot \sin\theta \quad (12)$$

Consequently, a moving direction of the measured object is obtained since the magnitude relation of $2f_d$ is determined according to the positive and negative signs of the speed V with respect to the given velocity of $V_g$. According to the abovementioned optical system, however, a rotating mechanism for the diffraction grating 103 is required with result that the LDV becomes larger in size and higher in cost. In addition, the rotational speed of the diffraction grating 103 needs to be precisely maintained. However, it is difficult to employ the LDV for precise measurement due to problems such as an error caused by eccentricity, vibration and so on caused by rotation.

A velocimeter which solves the above problems is disclosed in JP 04-204104 A. In JP 04-204104 A, a moving direction of a measured object is detected by using a frequency shifter to change a frequency of an incident light flux.

FIG. 16 shows a schematic view of an optical system of a velocimeter disclosed in JP 04-204104 A.

According to the velocimeter, a light emitted from a laser light source 101 becomes a parallel light flux by a CL 104, and then are split into two light fluxes by a beam splitter (hereinafter, referred to as BS) 109. The respective light fluxes are reflected by mirrors 105 and are then frequency-shifted by $f_1$ and $f_2$ by an acousto-optic device (hereinafter, referred to as AOM) 110. The light fluxes are again collected on a surface of a measured object 113 by a diffraction grating 103 and then a beat frequency of scattered light from the measured object 113 is detected using a PD 102. The frequency $2f_d$ to be detected here is indicated by the following equation:

$$2f_d = (|f_1 - f_2|) + \frac{2V}{\lambda} \cdot \sin\theta \quad (13)$$

Consequently, a moving direction of the measured object 113 is detected by a magnitude relation of $2f_d$ with respect to a known frequency shift quantity $|f_1-f_2|$ since the sign of V changes according to the moving direction of the measured object 113.

Also in JP 08-15435 A, frequency is changed using an electro-optical device (hereinafter, referred to as EOM) 111 shown in FIG. 17 based on the same principle as that of JP 04-204104 A. More specifically, light emitted from a LD 101, which is a laser light source, becomes a parallel light flux by a CL 104, and is then split into two light fluxes comprised of a first light flux 107 and a second light flux 108 by a diffraction grating 103. The first and second light fluxes 107 and 108 are respectively made incident on the EOMs 111. Here, bias is applied to the second light flux 108 to shift frequency by $f_R$. The first and second light fluxes 107 and 108 are respectively reflected by mirrors 105, and then are collected on a surface of the measured object 113. The beat frequency of lights scattered from the surface of the measured object 113 is detected using a PD 102. The frequency $2f_d$ to be detected here is indicated by the following equation:

$$2f_d = f_R + \frac{2V}{\lambda} \cdot \sin\theta \qquad (14)$$

Thus, similarly to Equation (13), the moving direction of the measured object 113 is detected by the magnitude relation of $2f_d$ with respect to a known frequency shift quantity $f_R$ since the sign of V changes according to the moving direction of the object.

However, an optical system where the moving direction of the measured object 113 is detected using frequency shifters such as the AOM 110 and the EOM 111, is disadvantageous in that the optical system is more complex and made larger in size since a power source for driving the frequency shifters is required so as to produce about tens of volts necessary to frequency-modulate by the AOM 110 or about 100 volts necessary to frequency-modulate by the EOM 111, for example, with the result that a large-sized power source is required.

Requests for miniaturization and lower power consumption concerning various sensors including the LDV have increased more and more, and this tendency is particularly strong for consumer products. Since the LDV detects scattered light, signal light from a measured object is generally weak although its strength may be different according to a type of the measured object. One solution is to employ a photomultiplier tube as a photodetector having high photosensitivity. However, when the photomultiplier tube is employed for the LDV, it causes the LDV itself to be large-sized. That is, the LDV including a photomultiplier tube is not suitable for application to small-sized consumer products. Instead, a photodiode, which is inferior as a photodetector in photosensitivity, is generally employed, so as not to obstruct miniaturization thereof. In this case, as much signal light as possible is preferably made incident on the photodetector. However, there is a limitation on a light reception system simply being disposed closer to the measured object since the distance between the light scattering surface of the measured object 113 and a condenser lens 106 is usually limited due to factors such as arrangement of optical components. As another measure for as much signal light as possible to be made incident on the photodetector, it is also possible to increase incident light quantity by employing gas lasers and so on of He-Ne and Ar+ as a high-power laser source, but a semiconductor laser is preferred from the viewpoint of device miniaturization and lower power consumption. In an LDV, a travel direction of a measured object is specified and is limited to a one-dimensional detection. Therefore, in order to obtain a two-dimensional velocity by an LDV, it is required that two-dimensional velocity is calculated based on velocities obtained from the two LDVs arranged in two different directions. When the two LDVs are thus employed, it is not practical not only because there is a possibility that an error is caused by the rotation, expansion and contraction of a measured object due to the different detection points, but also because space and cost for two devices are required.

SUMMARY OF THE INVENTION

Accordingly, an object of the present invention is to provide an optical velocimeter, displacement information measurement device and conveying and processing device which can reduce a size and power consumption thereof and which can detect a two-dimensional travel velocity of a measured object highly precisely.

In order to solve the above problems, there is provided an optical velocimeter comprising:
a light-emitting element for emitting coherent light;
a light branch section for branching light emitted from the light-emitting element into at least three light fluxes;
an optical system for intersecting on a measured object optical axes of the respective light fluxes branched by the light branch section one another to form one detection point;
at least two light-receiving sections for receiving scattered light frequency-shifted by travel of the measured object from the detection point; and
a signal processing circuit for processing light-reception signals outputted from the at least two light-receiving sections to detect at least two directions of traveling velocity of the measured object.

Here, in this specification, a semiconductor laser diode and a light-emitting diode, for example, are employed as the light-emitting element. As the light branch section, a diffraction grating and a beam splitter, for example, are employed. The optical system contains a mirror for changing the direction of the optical axis of the divided light flux, and a wavelength plate such as a λ/2 plate and a λ/4 plate for changing the polarization state of the divided light flux, for example. The light-receiving section has a photodetector such as a photodiode and so on and obtains a light-receiving signal by photoelectrically converting the scattered light. The frequency of the light-receiving signal corresponds to the velocity of the measured object.

According to the optical velocimeter of the present invention, the light flux emitted from the light-emitting element for emitting coherent light is divided, and the divided light fluxes are intersected from a plurality of directions at one detection point, and scattered lights from the detection point are received by a plurality of light-receiving sections. Therefore, a small-sized LDV is provided which detects two-dimensional velocity with low power consumption highly sensitively and precisely by one device, as compared to a conventional LDV employing laser.

In one embodiment, the light fluxes for forming the detection point are three light fluxes which are a first light flux, a second light flux and a third light flux;
the optical system includes a deflection section for deflecting optical axes of the second light flux and the third light flux, and a polarization state change section for changing polarization state so that at least a polarization state of the first light flux is different from polarization states of the second and third light fluxes;
the light-receiving section has a first light-receiving section for receiving scattered light of the first light flux and scattered light of the second light flux which are different from each other in polarization state, and a second light-receiving section for receiving scattered light of the first light flux and scattered light of the third light flux which are different from each other in polarization state;

the first light-receiving section and the second light-receiving section respectively include a dividing section for dividing incident scattered light into two, and two photodetectors for respectively receiving the divided scattered lights divided by the dividing section through mutually orthogonal polarizers; and the signal processing circuit determines travel direction of the measured object and detects two-dimensional travel velocity of the measured object based on two light-reception signals having difference in phase caused by difference of polarization states obtained by the two photodetectors of the respective light-receiving sections.

Here, in this specification, a diffraction grating, for example, is employed as the dividing section and a linear polarization plate, for example, is employed as the polarizer.

According to the optical velocimeter of this embodiment, the two-dimensional travel velocities of the measured object is detected by a simple structure as a minimum unit.

In one embodiment, the light branch section is a diffraction grating, the first light flux corresponds to a zero order diffracted light branched by the diffraction grating, and the second light flux and the third light flux correspond to diffracted lights of a predetermined order branched by the diffraction grating.

According to the optical velocimeter of this embodiment, the diffraction grating branches a light flux into three light fluxes (minimum unit) with the result that miniaturization of the velocimeter is achieved.

In one embodiment, the diffraction grating has a structure such that a first plane defined by the first light flux and the second light flux, and a second plane defined by the first light flux and the third light flux are roughly orthogonal to each other.

Here, in this specification, in a coordinate system where the detection point is arranged at an origin, the first plane corresponds to the x-z incident surface and the second plane corresponds to the y-z incident surface, for example.

According to the optical velocimeter of this embodiment, since the diffraction grating has the grating structure such that the first plane and the second plane are roughly orthogonal to each other, the number of components such as a mirror and so on for changing the direction of a light flux is reduce with the result that the optical velocimeter is made further lower in cost and further miniaturized.

In one embodiment, the signal processing circuit calculates a velocity component of a direction in parallel with the first plane and orthogonal to the first light flux and a velocity component of a direction in parallel with the second plane and orthogonal to the first light flux, so as to detect a two-dimensional travel velocity of the measured object.

According to the embodiment, the signal processing circuit calculates the velocity component of the x-direction and the velocity component of the y-direction to securely detect the two-dimensional travel velocities of the measured object.

In one embodiment, in a coordinate system where the detection point is arranged at an origin, when one of the light fluxes for forming the detection point is obliquely made incident from a positive area on the detection point, the light-receiving section therefor is disposed in a negative area; and when another of the light fluxes for forming the detection point is obliquely made incident from a negative area on the detection point, the light-receiving section therefor is disposed in a positive area.

According to the embodiment, when the light fluxes are incident on the detection point from the positive directions of the x-direction and the y-direction, the light-receiving sections are arranged in negative areas, and when the light fluxes are incident on the detection point from the negative directions of the x-direction and the y-direction, the light-receiving sections are arranged in positive areas so that the light-receiving section securely receive scattered lights.

In one embodiment, the light-receiving section is disposed at a position to which the light flux obliquely incident on the detection point is regularly reflected.

According to the embodiment, the incident intensities of the scattered lights to the light-receiving sections are increased.

In one embodiment, the polarization state change section includes a $\lambda/4$ plate for changing a polarization state of the first light flux.

In one embodiment, the polarization state change section includes a $\lambda/4$ plate for changing a polarization state of the first light flux, and a $\lambda/2$ plate for changing a polarization state of either one of the second light flux and the third light flux.

In one embodiment, the polarization state change section includes a $\lambda/4$ plate for changing a polarization state of the second light flux, and a $\lambda/4$ plate for changing a polarization state of the third light flux.

In one embodiment, the polarization state change section includes a $\lambda/4$ plate for changing a polarization state of the second light flux, and a $\lambda/4$ plate for changing a polarization state of the third light flux so that the changed polarization state of the third light flux is shifted away by $\pi$ with respect to a phase of the second light flux of which a polarization state is changed In one embodiment, the diffraction grating is of a blazed-type.

According to the embodiment, the diffraction efficiency of the diffracted light of a prescribed order to be employed is improved and light-receiving intensity is increased with the result that detection accuracy is improved.

In one embodiment, a grating of the diffraction grating is divided into two areas which are an area for generating the second light flux and an area for generating the third light flux.

In one embodiment, cells having different grating directions of the diffraction grating are arranged in a matrix form in areas for generating the second light flux and the third light flux.

According to the optical velocimeter of this embodiment, even when the emitted light from the light-emitting element is not made incident on the center of the diffraction grating, the fluctuation in the intensities of the respective light fluxes are reduced with the result that the S/N of two-dimensional velocity components is improved.

In one embodiment, the diffraction grating has a diffraction efficiency so as to set intensities of lights of the respective light fluxes defining the detection point such that the scattered lights from the detection point are made at the same level in the right-receiving sections.

In the embodiment, the S/N of a light-receiving signal is improved.

In one embodiment, there is provided an optical block integrating the light branch section, the deflection section and the polarization state change section into one body.

According to the embodiment, the setting accuracy of optical components is improved and the size of the velocimeter is miniaturized.

In one embodiment, the polarization state change section is arranged in a notched portion provided in the optical block so that the polarization state change section is perpendicular to an optical axis of an incident light flux thereof.

In the embodiment, an error caused by an optical path difference is reduced so that the detection accuracy is improved.

In one embodiment, two photodetectors of the respective light-receiving sections are disposed in one chip.

According to the embodiment, the setting accuracy of components is improved while the number of components is decreased.

In one embodiment, the two photodetector are divided-type photodetectors.

In the embodiment, the device is made smaller in area and cost is lowered.

In one embodiment, the respective light-receiving sections are light-receiving sections with built-in signal processing circuit which combines the photodetector with the signal processing circuit.

In the embodiment, the velocimeter is miniaturized.

In one embodiment, the light-emitting element is a semiconductor laser diode.

According to the embodiment, the velocimeter is miniaturized and the cost thereof is reduced while using a device for emitting coherent light.

A displacement information measurement device of the present invention comprises the optical velocimeter, and measures displacement information of the measured object based on velocity information regarding the measured object and time information.

Since the displacement information measurement device of the present invention includes the optical velocimeter, the displacement amount of the measured object is measured highly precisely.

A conveying and processing device of the present invention comprises the optical velocimeter;

a conveying section for conveying the measured object; and a processing section for applying a predetermined process to the measured object, wherein the predetermined process is applied to the measured object while controlling conveying of the measured object based on at least one of velocity information and displacement information obtained from the optical velocimeter.

Since the conveying and processing device of the present invention includes the optical velocimeter, the conveying and processing device applies a prescribed process to the measured object highly precisely.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 17 is a schematic structural view of an essential part of another conventional LDV.

DETAILED DESCRIPTION OF THE PREFERRED EMBODIMENTS

The present invention will be described in further detail by way of embodiments shown in the accompanying drawings.

First Embodiment

Figure 1:
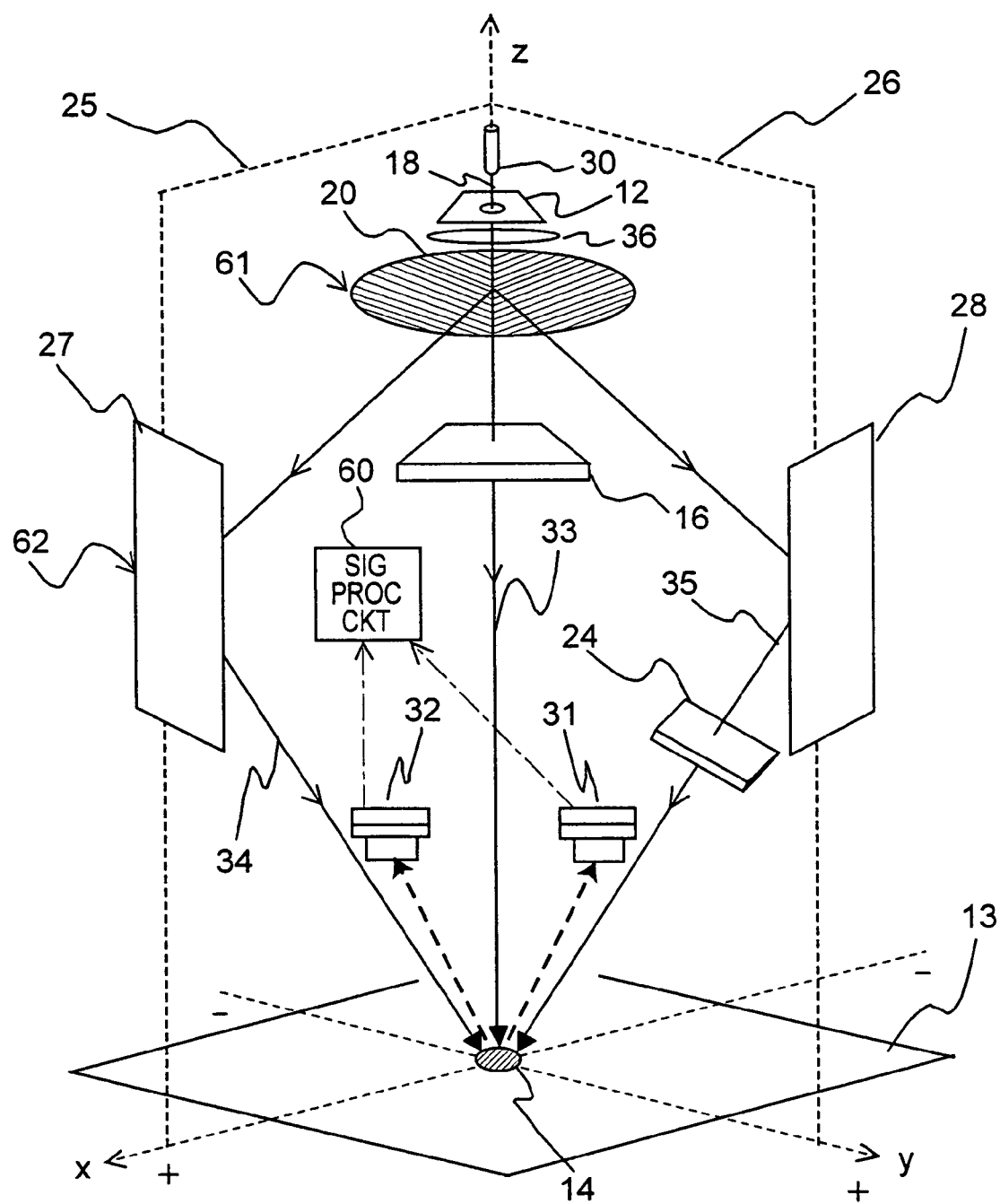
FIG. 1 is a schematic structural view showing an optical velocimeter of a first embodiment of the present invention.

FIG. 1 shows a schematic structural explanatory view of one embodiment of an optical velocimeter of the present invention. FIG. 1 shows only an arrangement of components such as optical components, and omits other components respectively holding the optical components. The arrows of FIG. 1 shown as broken lines denote the coordinate axes.

This optical velocimeter, which detects a travel velocity of a measured object 13, includes a light-emitting element 30 for emitting coherent light, an light branch section 61 for branching light emitted from the light-emitting element 30 into three light fluxes, an optical system 62 for forming one detection point 14 by intersecting on the measured object 13 the optical axes of the respective light fluxes branched by the light branch section 61, two light-receiving sections 31 and 32 for receiving scattered lights from this detection point 14 which are frequency-shifted by the travel of the measured object 13, and a signal processing circuit 60 for processing light-reception signals outputted from the two light-receiving sections 31 and 32 to detect the travel velocity of the measured object 13 in the two directions.

The light-emitting element 30, which is a semiconductor laser diode (LD) for example, easily generates a beat caused by the interference of the two light fluxes indicated in Equation (3). It is to be noted that a light-emitting diode (LED) such as a current constriction-type LED for example, may also be employed as the light-emitting element 30 provided that coherence is shown inside an optical path length of an optical system.

Generally, the intensity distribution of a light flux emitted from an LD is Gaussian distribution centering an optical axis of the light flux, and the intensity distribution has an elliptical far field pattern (FFP). As a result, when the light emitted from the LD 30 is directly irradiated the detection point 14, uneven intensity distribution in light is formed on the detection point 14 so that the intensity of the interference fringes shown in FIG. 5 becomes uneven, with the result that the highly precise evaluation of a beat signal becomes difficult. To avoid this problem, there is provided an aperture 12 so as to form a circular light flux 18 having even light intensity by cutting a part having weak light intensity which is around the optical axis of the light flux 18 emitted from the LD 30 by the aperture 12. It is to be noted that a prism may be employed instead of the aperture 12 to change an elliptical FFP to a circular FFP.

There is also provided an irradiation side lens 36 in the downstream of the aperture 12, and the irradiation side lens 36 is a collimate lens for collimating the light flux 18. It is to be noted that when the light-receiving intensity of the scattered light from the detection point 14 is low in the light-receiving sections 31 and 32, light may be collected at a light spot, which is the detection point 14, to increase the intensity using a combination lens or an aspherical lens which focuses light on the detection point 14.

In short, the light-emitting element 30, the aperture 12 and the irradiation side lens 36 are arranged along the z-axis in order.

The light branch section 61, which is a divided-type diffraction grating 20, divides the light flux 18 from the LD 30 collimated by the irradiation side lens 36 into three light fluxes of a first light flux 33, a second light flux 34 and a third light flux 35. It is to be noted that a beam splitter may be employed as the light branch section 61.

Figure 2A:
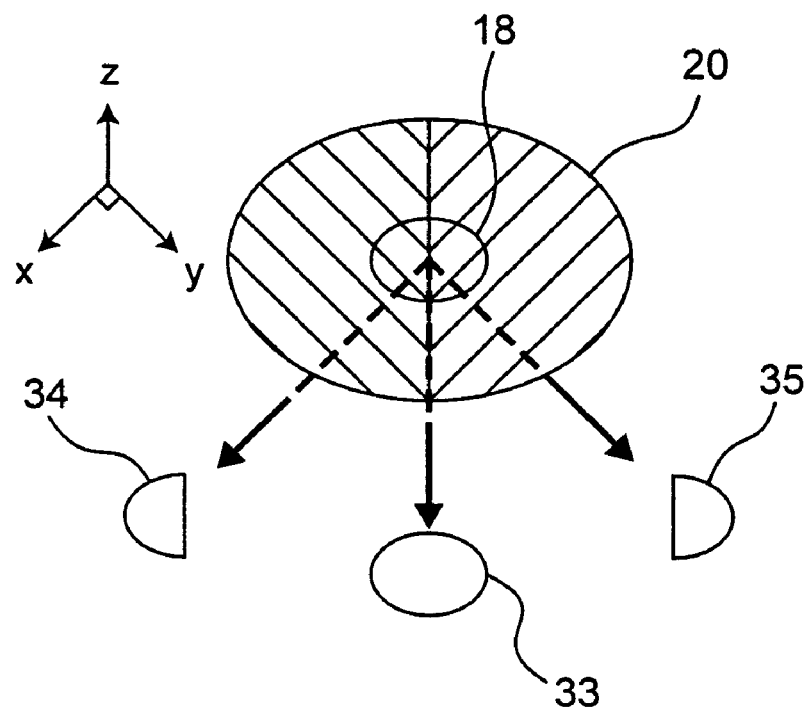
FIGS. 2A and 2B are schematic structural views explaining a function of a diffraction grating.
Figure 2B:
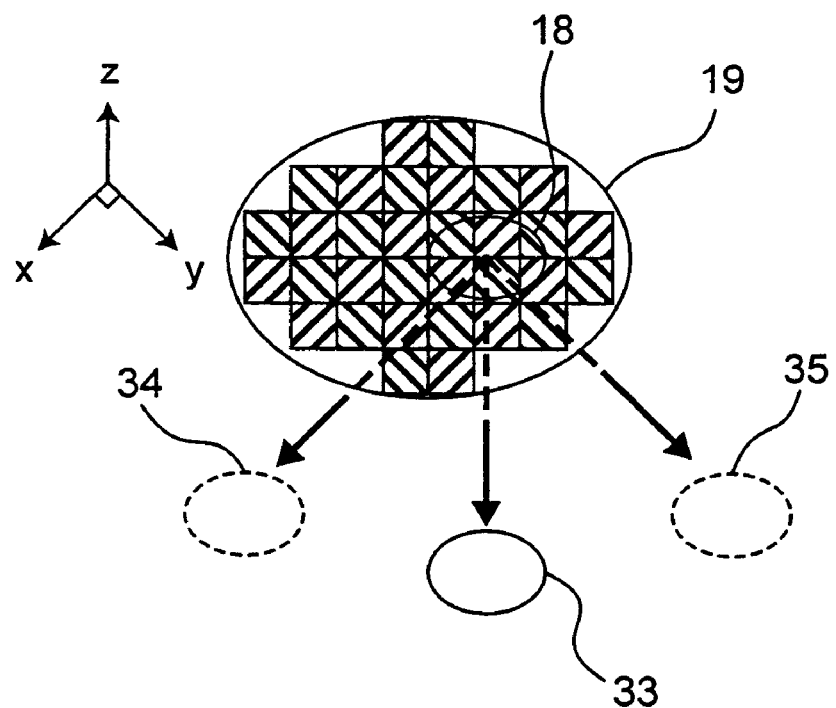

FIGS. 2A and 2B are schematic structural explanatory illustrations showing diffraction gratings which divide the light flux 18 in the first light flux 33, the second light flux 34 and the third light flux 35, wherein the second and third light fluxes 34 and 35 are orthogonal to each other.

FIG. 2A shows the divided-type diffraction grating 20 which has orthogonal grooves, and orthogonal diffracted lights are obtained by the grooves. Since two orthogonal diffracted light fluxes are generated by the diffraction grating 20, two incident surfaces can be formed with a smaller number of mirror components. It is to be noted that the diffraction efficiencies of the respective divided light fluxes are improved by using a blazed-type diffraction grating. Furthermore, light is collected in a prescribed direction by forming the shape of the groove into a hyperbola (not shown).

FIG. 2B shows a matrix-type diffraction grating 19 which is constituted by combining cells having different groove directions in a matrix form, and the diffraction grating 19 restrains fluctuations in the intensities of the second light flux 34 and third light flux 35 and in the size of the detection point 14 (spot size) even when the light flux 18 is not made incident on the center of the diffraction grating 19. It is to be noted that the actual size of one matrix cell is extremely small as compared to the size of the light flux 18.

The optical system 62 includes a deflection section for deflecting optical axes of the second and third light fluxes 34 and 35, and a polarization state change section for changing polarization states so that the first light flux 33 is different from the second and third light fluxes 34 and 35 in polarization state.

The first light flux 33 corresponds to a zero order diffracted light branched by the diffraction grating 20, and the second light flux 34 and the third light flux 35 correspond to the diffracted lights of prescribed order branched by the diffraction grating 20.

The deflection section has a first mirror 27 for changing the direction of the second light flux 34, and a second mirror 28 for changing the direction of the third light flux 35.

The polarization state change section has a $\lambda/4$ plate 16 for changing the first light flux 33 from a linear polarization of the light flux 18 to a circular polarization, and a $\lambda/2$ plate 24 for changing the third light flux 35 to a linear polarization so that the third light flux 35 is orthogonal to the second light flux 34 (phase difference $\pi$).

The first, second and third light fluxes 33, 34 and 35 are intersected into one at the detection point 14, which is a light spot located at the origin of a coordinate system.

Here, the first mirror 27 is located at (x1, 0, z1) such that the second light flux 34 is incident upon the detection point 14 through an x-z incident surface (first plane) 25. The second mirror 28 is located at (0, y1, z1) such that the third light flux 35 is incident upon the detection point 14 through a y-z incident surface (second plane) 26.

Figure 3:
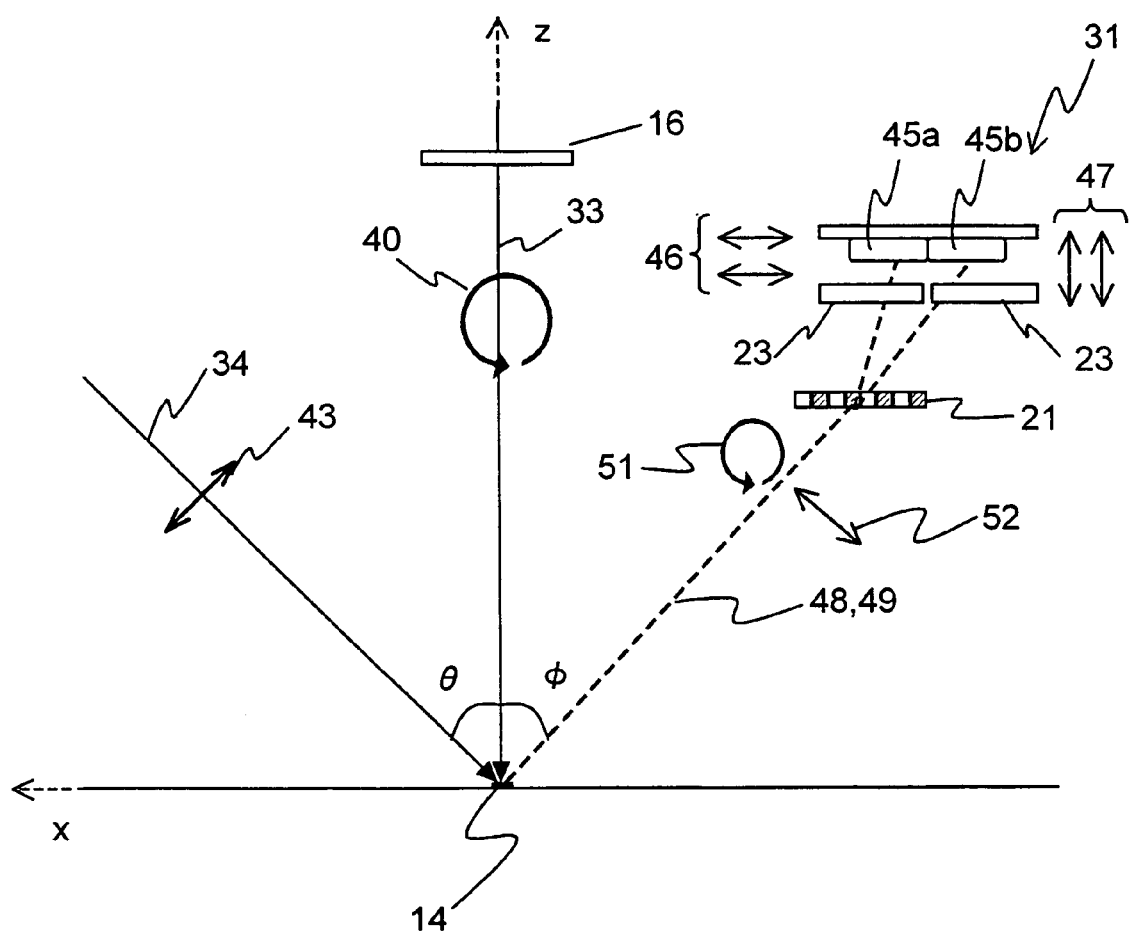
FIG. 3 is a schematic structural view describing an irradiation light flux and a detection of a diffuse light flux on an x-z incident surface.
Figure 4:
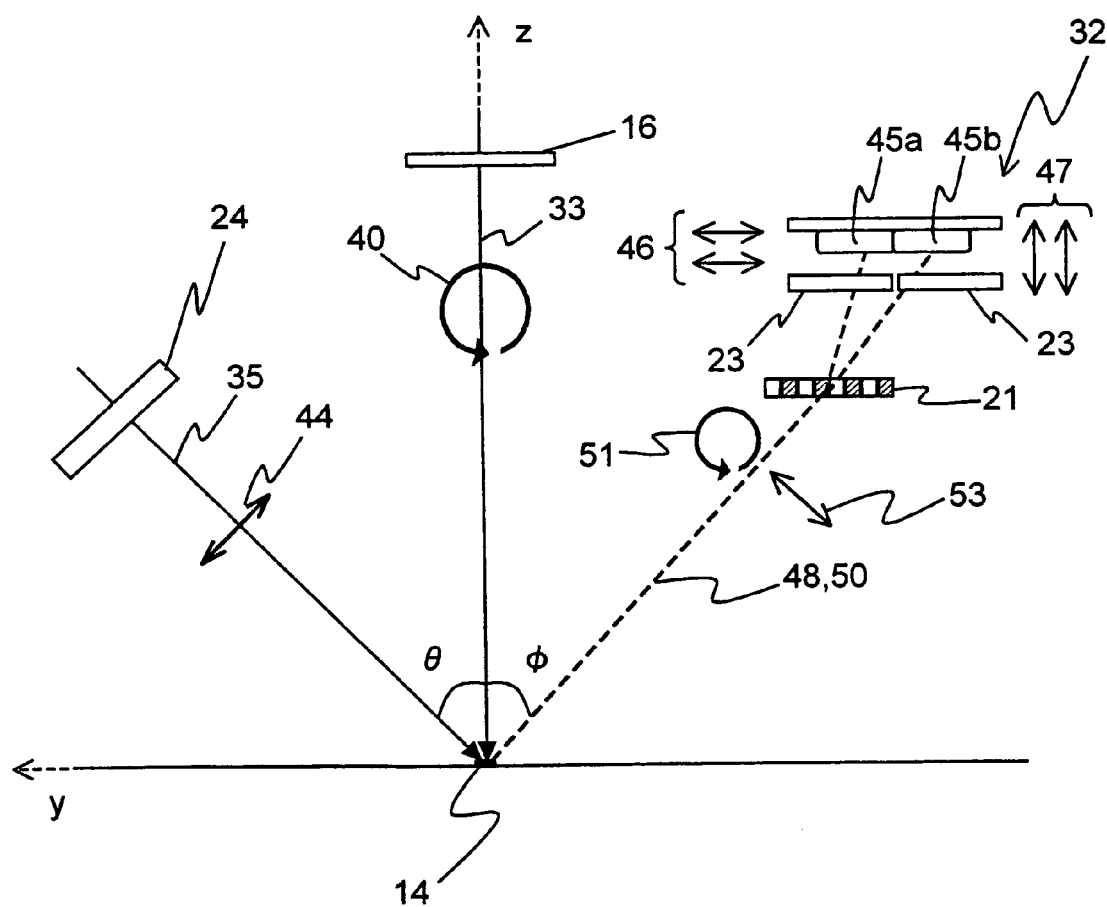
FIG. 4 is a schematic structural view describing an irradiation light flux and a detection of a diffuse light flux on a y-z incident surface.

FIG. 3 is a schematic view showing the state of the light flux in the x-z incident surface 25, and FIG. 4 is a schematic view showing the state of the light flux in the y-z incident surface 26.

Firstly, as shown in FIG. 3, when the first light flux 33 which is circularly polarized, is perpendicularly made incident on the detection point 14 while the second light flux 34 which is linearly polarized is made incident on the detection point 14 at an angle of $\theta$ to form one spot, thus interference fringes being generated.

Figure 5:
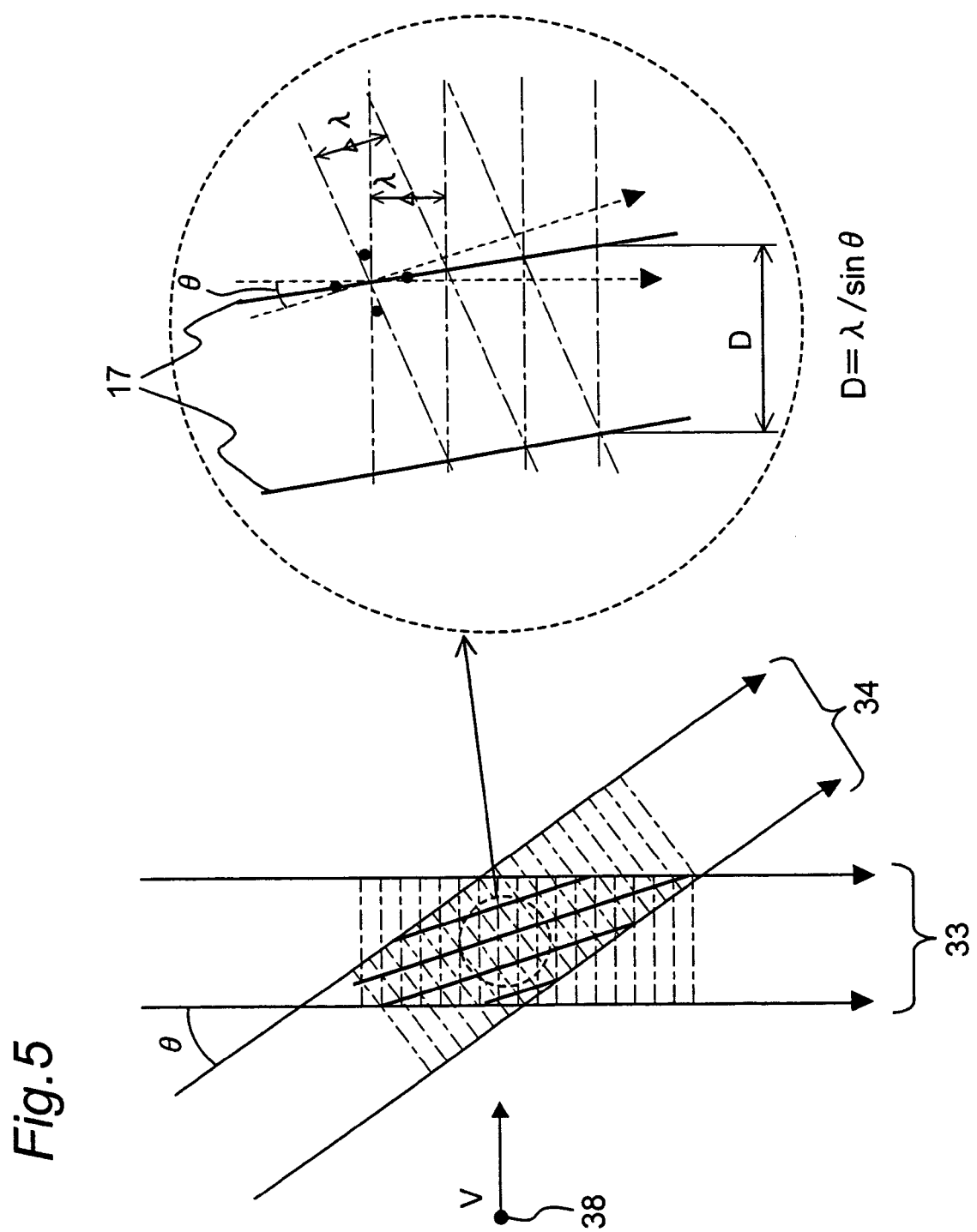
FIG. 5 is a schematic explanatory view showing interference fringes by a first light flux and a second light flux.

Here, FIG. 5 shows a schematic view of an interference fringe model of the above state. Specifically, the first light flux 33 and the second light flux 34 intersect at an angle of $\theta$, and dot-dash lines in the figure show parts of equal wave surfaces of the respective light fluxes. An interval between the adjacent dot-dash lines shows the wavelength of light $\lambda$. The interval of interference fringes 17 generated by the interference of the first light flux 33 and the second light flux 34 is indicated by the following equation:

$$D = \frac{\lambda}{\sin\theta} \quad (15)$$

When a particle 38 (measured object 13) moves at a velocity of V, a beat signal caused by a beat is detected at a frequency of F by these interference fringes 17 in the light-receiving sections 31 and 32. The frequency F to be detected here is indicated by the following equation based on Equation (15):

$$F = \frac{V}{\lambda} \cdot \sin\theta \tag{16}$$

This result corresponds to the result obtained when α=θ and β=0 are set in the above Equation (8).

As shown in FIG. 3, the polarization state of the first light flux 33 is a circular polarization 40 by the λ/4 plate 16, and first scattered light 48 of the first light flux 33 also roughly keeps this polarization state (circular polarization 51). On the other hand, the polarization state of the second light flux 34 is a linear polarization 43, and a second scattered light 49 of the second light flux 34 also roughly keeps this polarization state (linear polarization 52). Here, the conversion of the first light flux 33 to a circularly polarized light will be explained. Generally, a phase of light of a slow phase axis component is delayed in comparison with a phase of light of a fast phase axis component by π/2 by arranging the optical axis of the λ/4 plate 16 inclined at an angle of 45° with respect to the polarization direction of incident light with the result that linearly polarized light is converted into circularly polarized light.

The first scattered light 48 and the second scattered light 49 are received by the first light-receiving section 31. The first light-receiving section 31 includes a dividing section 21 for dividing the incident first scattered light 48 and the incident second scattered light 49 into two, respectively, and two photodetectors 45a and 45b for receiving each of the divided light divided in the dividing section 21 through mutually orthogonal polarizers 23a and 23b.

The dividing section 21, which is a diffraction grating, is suitable for dividing the light flux of the scattered light. It is to be noted that a beam splitter may be used as the dividing section 21.

The polarizers 23, which are linear polarizers, makes only prescribed polarization components of the respective divided lights incident on the photodetectors 45a and 45b. It is to be noted that "prescribed polarization components" are, for example, polarization directions which are inclined at angles of ±45° with respect to the linear polarization direction 52 of the second scattered light 49, and which are along a phase-advanced axis and a phase-lagging axis of the circular polarization 51 of the first scattered light 48.

Photodiodes (PDs) are employed as the photodetectors 45a and 45b. A photodetector having two light-receiving faces on a single chip may be employed as this photodetector, but a divided-type photodetector is preferable in terms of size and cost.

Referring now to the light-receiving signal (beat signal) obtained in the photodetectors 45a and 45b, when distances between the dividing section (diffraction grating) 21 and the photodetectors 45a and 45b are equal to each other, a first beat signal of one photodetector 45a is represented by the following Equation (17), and a second beat signal of the other photodetector 45b is represented by the following Equation (18):

$$\frac{E_{1a}^2 + E_{2a}^2}{2} + E_{1a} \cdot E_{2a} \cdot \cos(2\pi Ft) \tag{17}$$

$$\frac{E_{1b}^2 + E_{2b}^2}{2} + E_{1b} \cdot E_{2b} \cdot \cos(2\pi Ft + \pi/2) \tag{18}$$

Here, $E_{1a}$ and $E_{1b}$ denote amplitudes of the first scattered lights 48 received by the photodetectors 45a and 45b, $E_{2a}$ and $E_{2b}$ denote amplitudes of the second scattered lights 49 received by the photodetectors 45a and 45b, F denotes a beat frequency, and t denotes time. It is to be noted that the second beat signal in Equation (18) is the signal of the phase-lagging axis of circularly polarized light, which is generated by the linear polarizer 23. In Equation (18), a phase component appears by the phase-lagging axis of circularly polarized light, and the sign of the phase component in cosine of a second term thereof varies according to the travel direction of the measured object 13. When the measured object 13 travels to the +x direction, the sign becomes +π/2, and when the measured object 13 travels to the −x direction, the sign becomes −π/2.

Figure 6A:
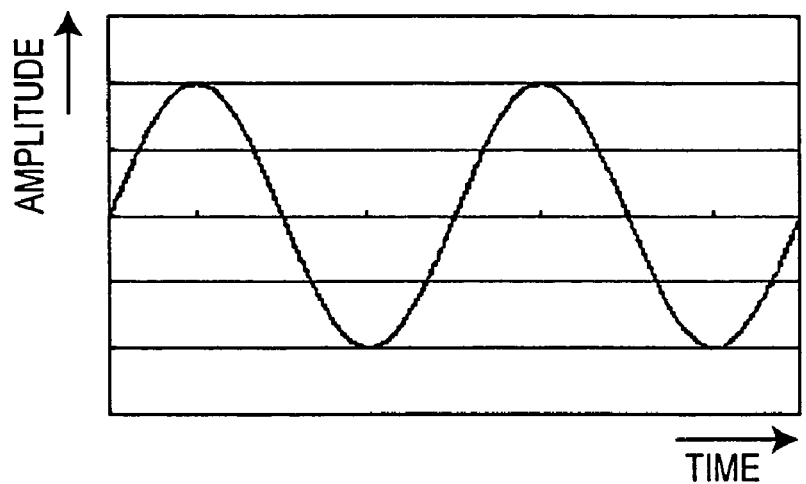
FIGS. 6A, 6B and 6C are signal diagrams explaining the detection of travel direction of a measured object by a phase information of a beat signal obtained by a photodetector.
Figure 6B:
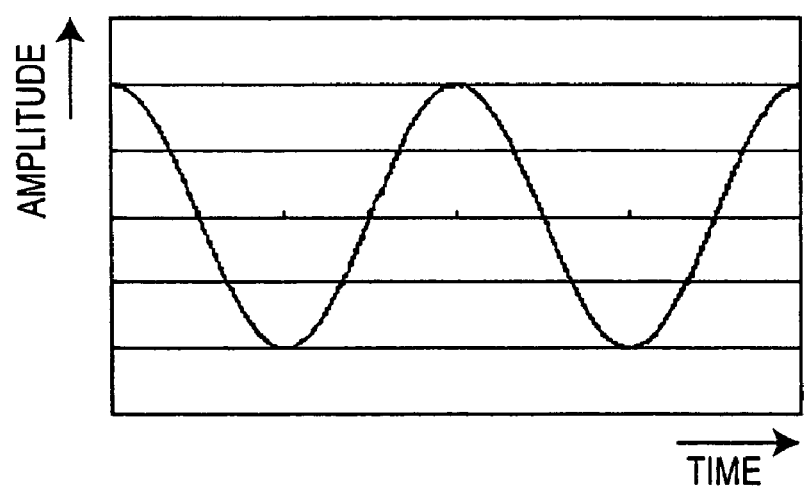
Figure 6C:
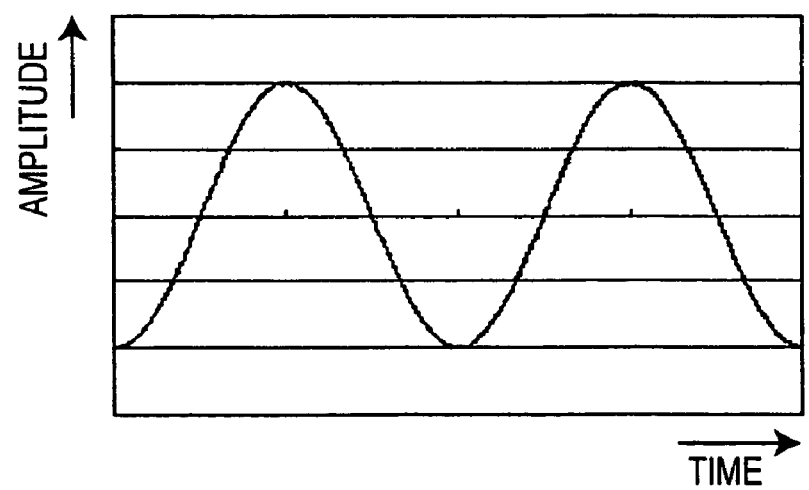

FIGS. 6A, 6B and 6C illustrate Equation (17) and Equation (18). That is, FIG. 6A shows the first beat signal expressed by Equation (17), and the first beat signal is independent of the travel direction of the measured object 13. FIG. 6B shows the second beat signal generated when the measured object 13 travels in the positive direction along the axis, and FIG. 6C shows the second beat signal generated when the measured object 13 travels in the negative direction along the axis. It can be seen that the phase of the second beat signal is shifted away by π/2 according to the travel direction as compared with the beat signal shown in FIG. 6A. The moving direction of the measured object 13 is detected by detecting this phase shift by the photodetectors 45a and 45b. In order to detect the travel direction, it is needed to judge whether the phase of the second beat signal is advanced or delayed in comparison with the phase of the first beat signal, and it is not needed to determine whether or not the phase shift is precisely ±π/2. Therefore, it does not matter even if there are arrangement errors of optical path difference, wavelength plate and linear polarizer to some extent.

The first light-receiving section 31 receives first scattered light 48 by the first light flux 33 and the second scattered light 49 by the second light flux 34. Although the third scattered light 50 of the third light flux 35 is partially made incident on the first light-receiving section 31, this incident light can be ignored by optimizing the arrangement of the first light-receiving section 31 with the result that detection accuracy is improved.

For example, it is preferable to set a position in which the first scattered light 48 and the second scattered light 49 can be detected apart from the y-z incident surface 26, located on the regular reflection direction (θ=φ) axis of the second light flux 34 within the x-z surface 25.

It is to be noted that reference numeral 46 denotes the linearly polarized light having the phase shift away from the linear polarization of incident light flux by π/4, and reference numeral 47 denotes the linearly polarized light orthogonal to the linearly polarized light 46.

With the abovementioned structure, the first beat signal and the second beat signal are detected, wherein the x-axis direction velocity is detected from beat frequency fd based on Equation (16) and the positive and negative directions along the axis are detected from the phase shift of Equation (17) and Equation (18), by the signal processing circuit 60. It is to be noted that a light-receiving section with built-in circuit which incorporates the signal processing circuit 60 into the light-receiving section 31 and 32 can reduce the size of the optical velocitimeter.

Thus, one-dimensional velocity is detected by the method using the first light-receiving section 31.

Also in the optical system on the y-z incident surface 26 shown in FIG. 4, similarly to the case of the x-z incident surface 25 shown in FIG. 3, the velocity along the y-axis direction and the positive and negative directions along the axis are detected.

The difference between the detection methods of FIG. 3 and FIG. 4 is that the phase of the linear polarization 44 of the third light flux 35 is shifted away from the phase of the linear polarization 43 of the second light flux 34 by π. This is because the influence of the third scattered light 50 of the third light flux 35 on the first light-receiving section 31 for the second scattered light 49 of the second light flux 34 in FIG. 3, and the influence of the second scattered light 49 of the second light flux 34 on the second light-receiving section 32 for the third scattered light 50 of the third light flux 35 in FIG. 4 are reduced, by changing polarization direction to improve detection accuracy. It goes without saying that when the influence of the second scattered light 49 of the second light flux 34 on the second light-receiving section 32 can be ignored, the phase of the linear polarization 44 of the third light flux 35 is not required to be shifted away from the phase of the linear polarization 43 of the second light flux 34 by π(λ/2 plate 24 is not required)

In the third light flux 35, the polarization state of light is changed by using the λ/2 plate 24. It is to be noted that the polarization state of the third light flux 35 is the linear polarization 44 and the third scattered light 50 also roughly keeps this polarization state (linear polarization 53).

Since the traveling velocities and the positive and negative directions along axes of the measured object 13 on the x-z incident surface 25 and the y-z incident surface 26 are detected by the first light-receiving section 31 and the second light-receiving section 32, a two-dimensional velocity of the measured object 13 can be detected by obtaining a sum thereof in terms of vector.

Figure 7A:
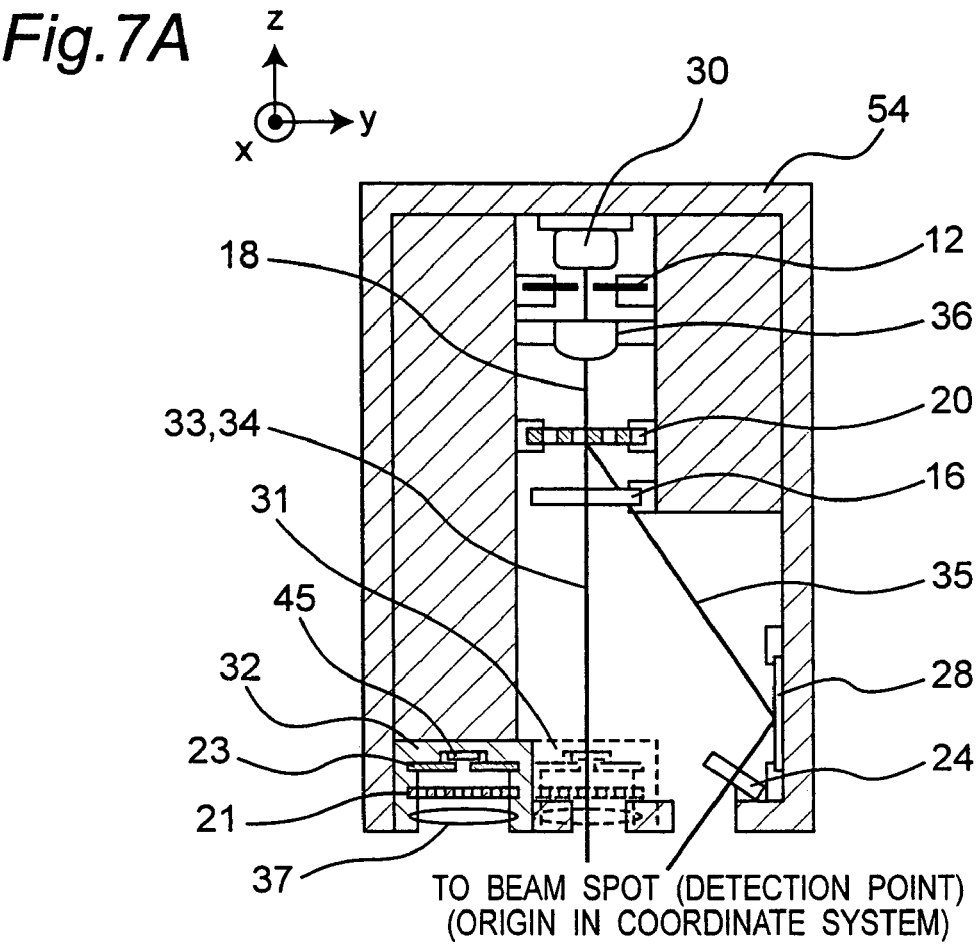
FIGS. 7A and 7B are schematic structural views showing a state in which an optical element and an optical component are mounted to a housing.
Figure 7B:
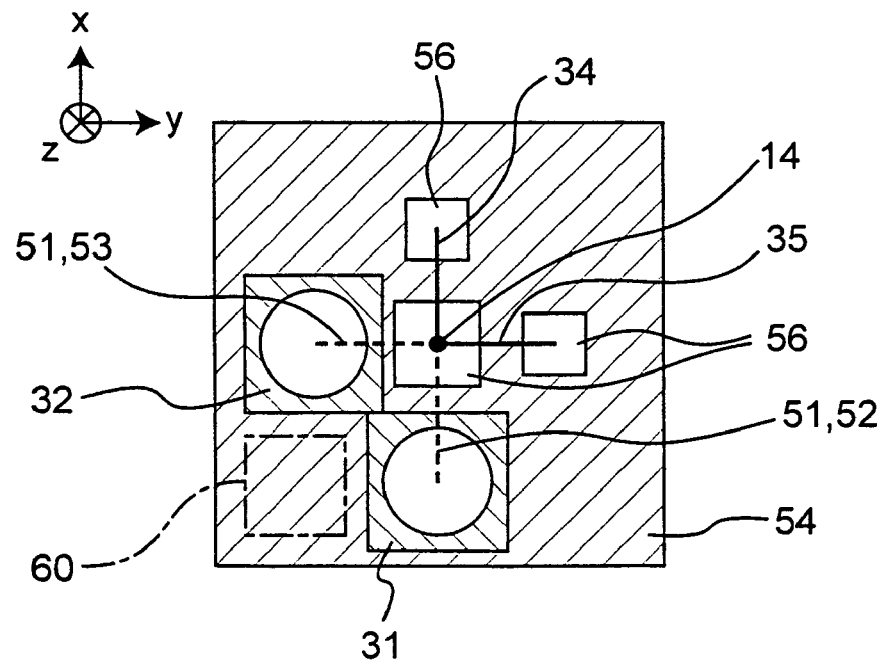

As shown in FIG. 7A which is a sectional side view and FIG. 7B which is a bottom view, the respective optical components are hold and arranged in a housing 54. Openings 56 for passing light fluxes are provided on a bottom face of this housing 54.

Figure 8A:
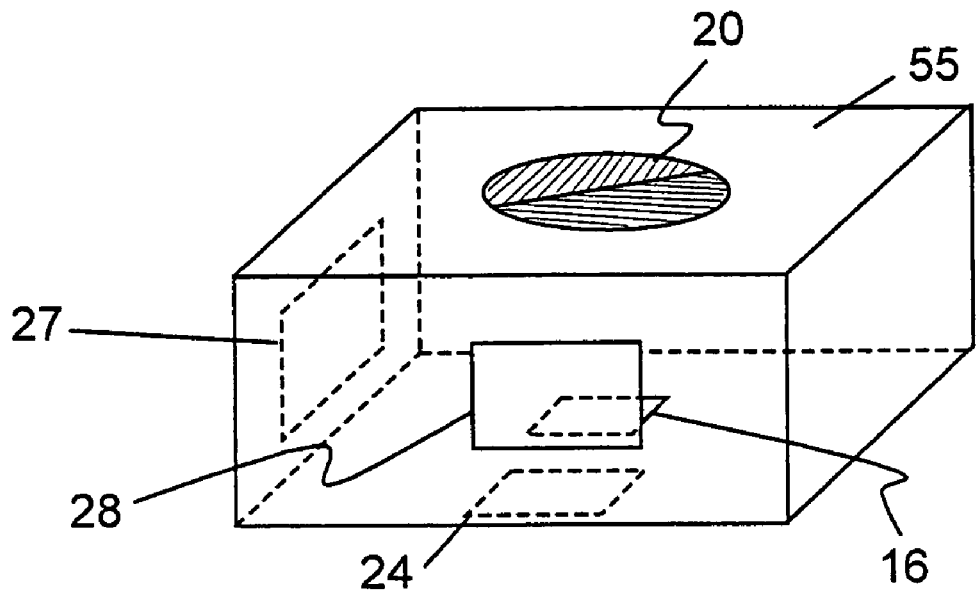
FIGS. 8A and 8B are schematic structural views showing a state in which an LDV optical system forms an optical block.
Figure 8B:
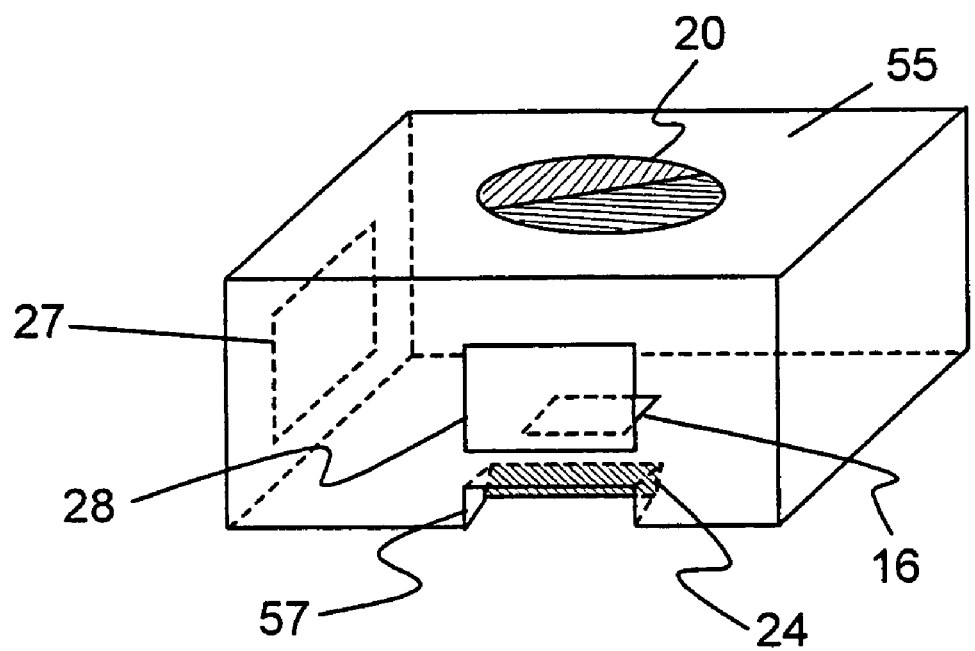

As shown in FIGS. 8A and 8B, there may be provided an optical block 55 (rectangular parallelepiped in shape) for integrating the diffraction grating 20, the first and second mirrors 27 and 28, the λ/4 plate 16 and the λ/2 plate 24 into one body to improve detection accuracy by reducing arrangement error.

In FIG. 8A, the optical components are arranged on each face of the optical block 55. In FIG. 8B, a notched portion 57 is provided in the optical block 55, and the λ/2 plate 24 is diagonally arranged in this notched portion 57. These allows the third light flux 35 to be incident perpendicularly on the λ/2 plate 24 with the result that the arrangement error of the wavelength plate is reduced to improve detection accuracy.

Second Embodiment

Figure 9:
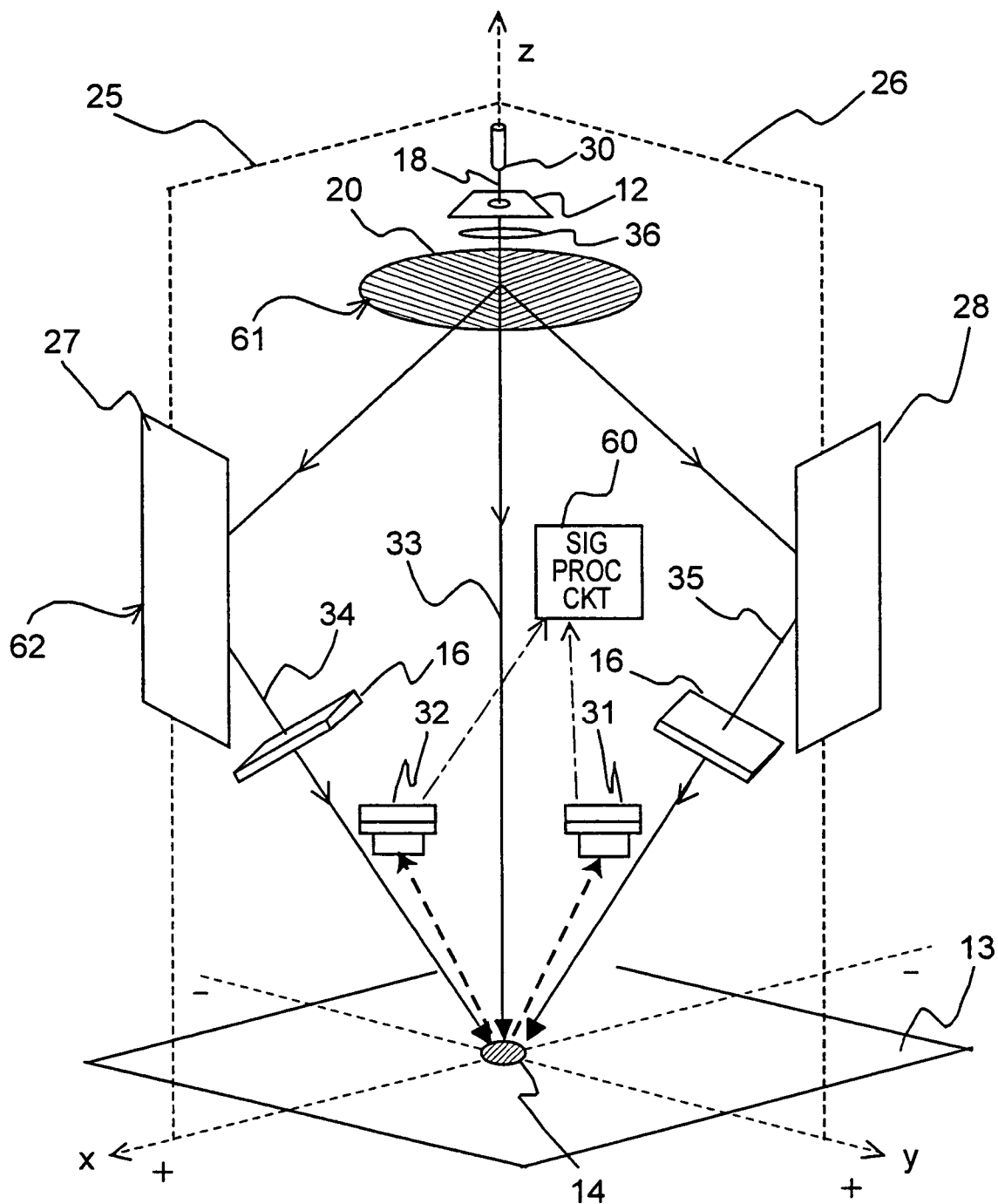
FIG. 9 is a schematic structural view showing an optical velocimeter of a second embodiment of the present invention.

FIG. 9 shows another embodiment of the present invention. FIG. 9 shows only an arrangement of respective optical components and so on and omits other components respectively holding the optical components. The optical components other than wavelength plates as a polarization state change section and the arrangement thereof are similar to those of the first embodiment, and the description thereof will be omitted hereinafter.

In this optical velocimeter, a first light flux 33, which is divided in a diffraction grating 20, is made incident on a light spot, which is a detection point 14, keeping a linear polarization of light emitted from an LD 30. A second light flux 34, of which direction is changed to a direction for the detection point 14 by a first mirror 27, is then converted from linearly polarized light to circularly polarized light by a λ/4 plate 16 and is made incident on the detection point 14. A third light flux 35, of which direction is changed to a direction for the detection point 14 by a second mirror 28, is made incident on the detection point 14 in a circular polarization in a rotation reverse to that of the second light flux 34, by the λ/4 plate 16 arranged so as to be shifted away from the phase of the circularly polarized light of the second light flux 34 by π.

Figure 10:
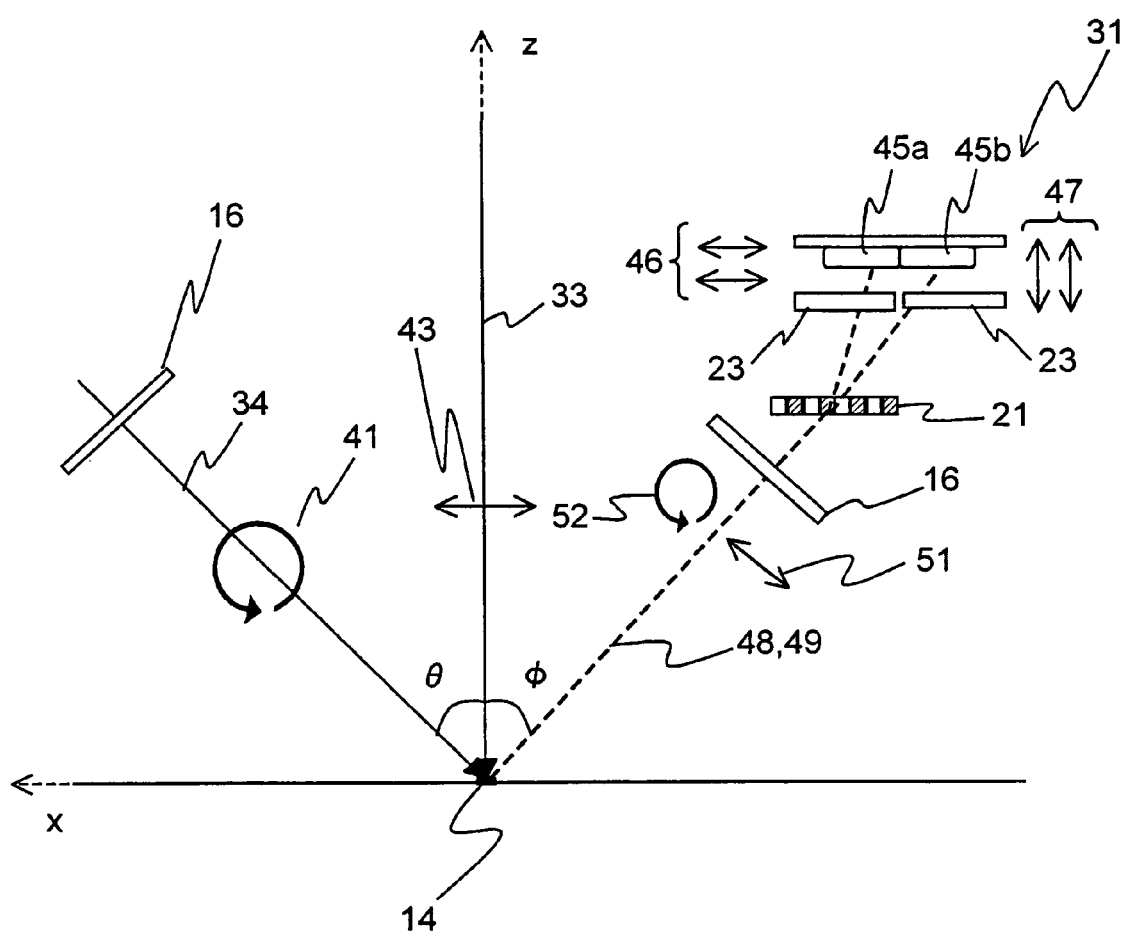
FIG. 10 is a schematic structural view explaining an irradiation light flux and a detection of a diffuse light flux on an x-z incident surface.
Figure 11:
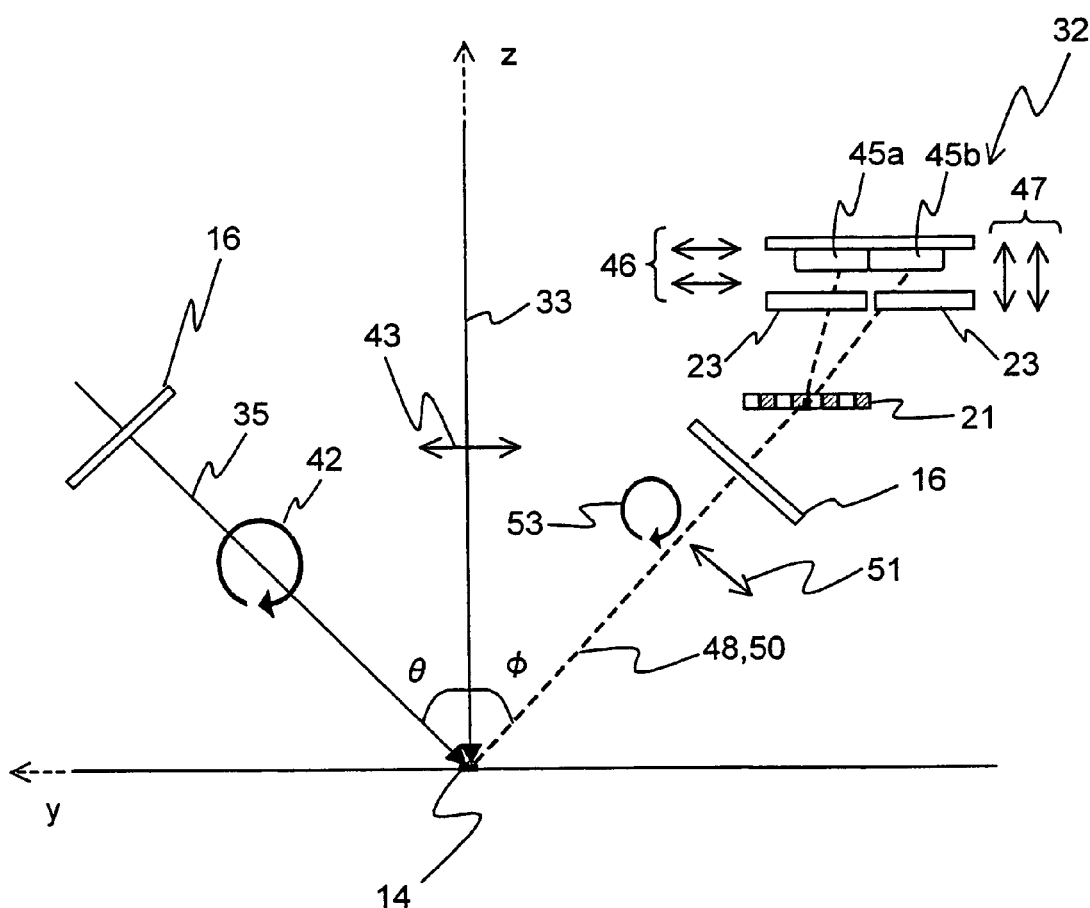
FIG. 11 is a schematic structural view explaining an irradiation light flux and a detection of a diffuse light flux on a y-z incident surface.

As a result, as shown in FIGS. 10 and 11, when the second light flux 34 is a counterclockwise circularly polarized light 41, the third light flux 35 is a clockwise circularly polarized light 42. The first light flux 33 is a linearly polarized light 43, the first scattered light 48 is a linearly polarized light 51, the second scattered light 49 is a clockwise circularly polarized light 52, and the third scattered light 50 is a counterclockwise circularly polarized light 53.

The first light-receiving section 31 is arranged at a position where the first scattered light 48 and the second scattered light 49 are efficiently received in terms of intensities thereof, and a λ/4 plate 16 is arranged in front of an incident surface of the first light-receiving section 31 so that the first scattered light 48 may be circularly polarized and so that the second scattered light 49 may be linear polarized.

In addition, the second light-receiving section 32 is arranged at a position where the first scattered light 48 and the third scattered light 50 are efficiently received in terms of intensities thereof, a λ/4 plate 16 is arranged in front of the second receiving section 32 so that the first scattered light may be circularly polarized and so that the third scattered light 50 may be linear polarized.

The λ/4 plate 16 is provided taking into consideration that a beat signal having phase difference for detecting travel direction is not sufficiently obtained when the second scattered light 49 and the third scattered light 50 get out of circularly polarized light to elliptically polarized light, but the phase difference is more easily obtained when the first scattered light 48, which is linearly polarized, is converted into a circularly polarized light. It is to be noted that the phase difference is not required to be just π/2 as described in the first embodiment. It goes without saying that the λ/4 plate 16 is not necessarily required, when the phase difference is obtained.

Consequently, the beat signals of Equation (17) and Equation (18) (phase difference thereof is about π/2) is obtained and two-dimensional travel velocity and travel direction of a measured object is detected using Equation (16) by signal-processing in a similar method to the first embodiment.

Figure 12A:
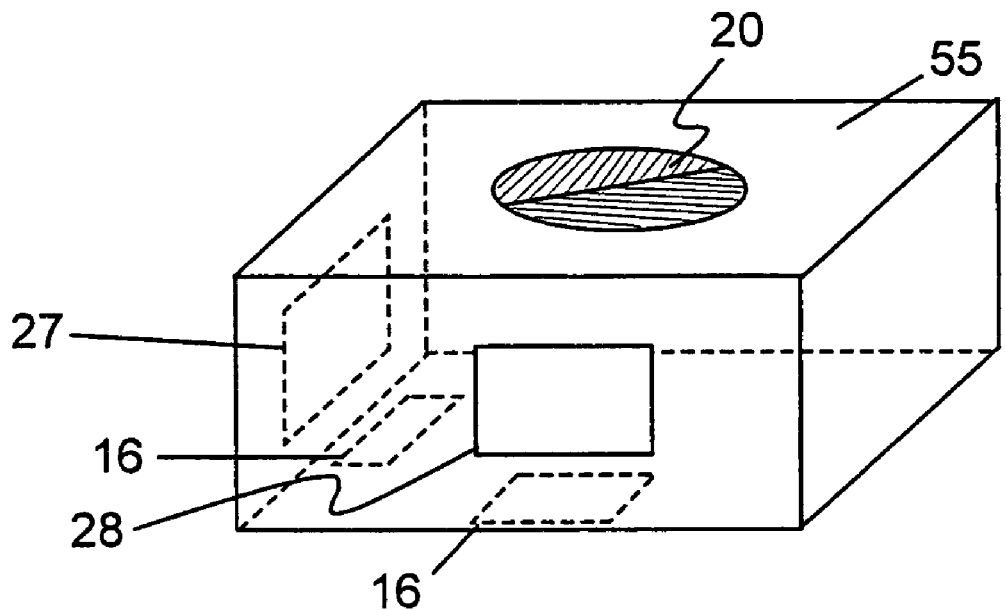
FIGS. 12A and 12B are schematic structural views showing a state in which an LDV optical system forms an optical block.
Figure 12B:
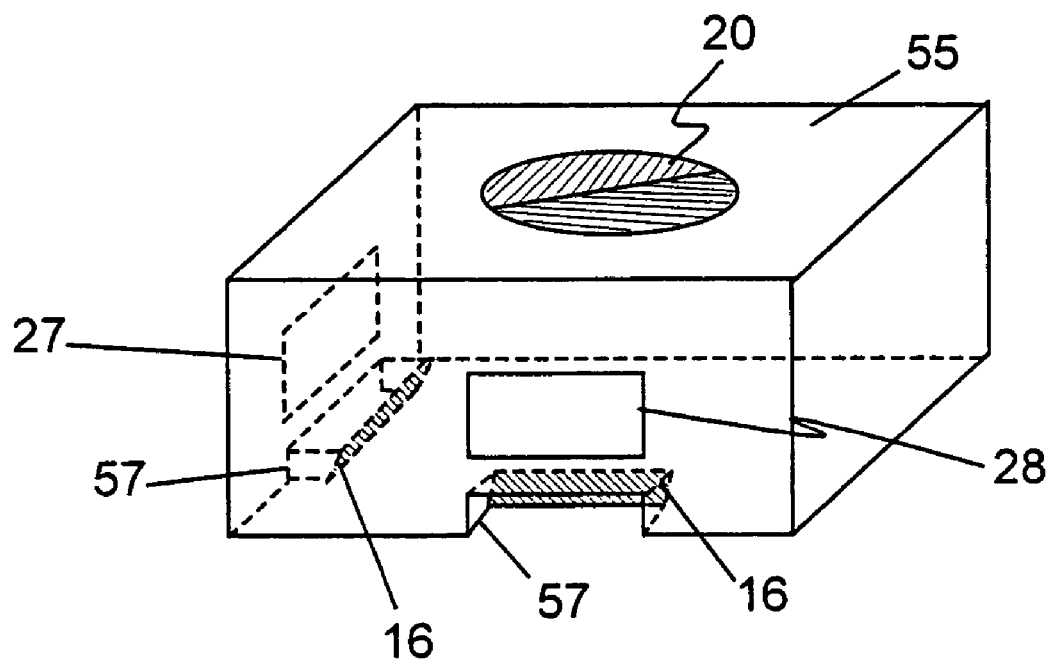
Figure 13:
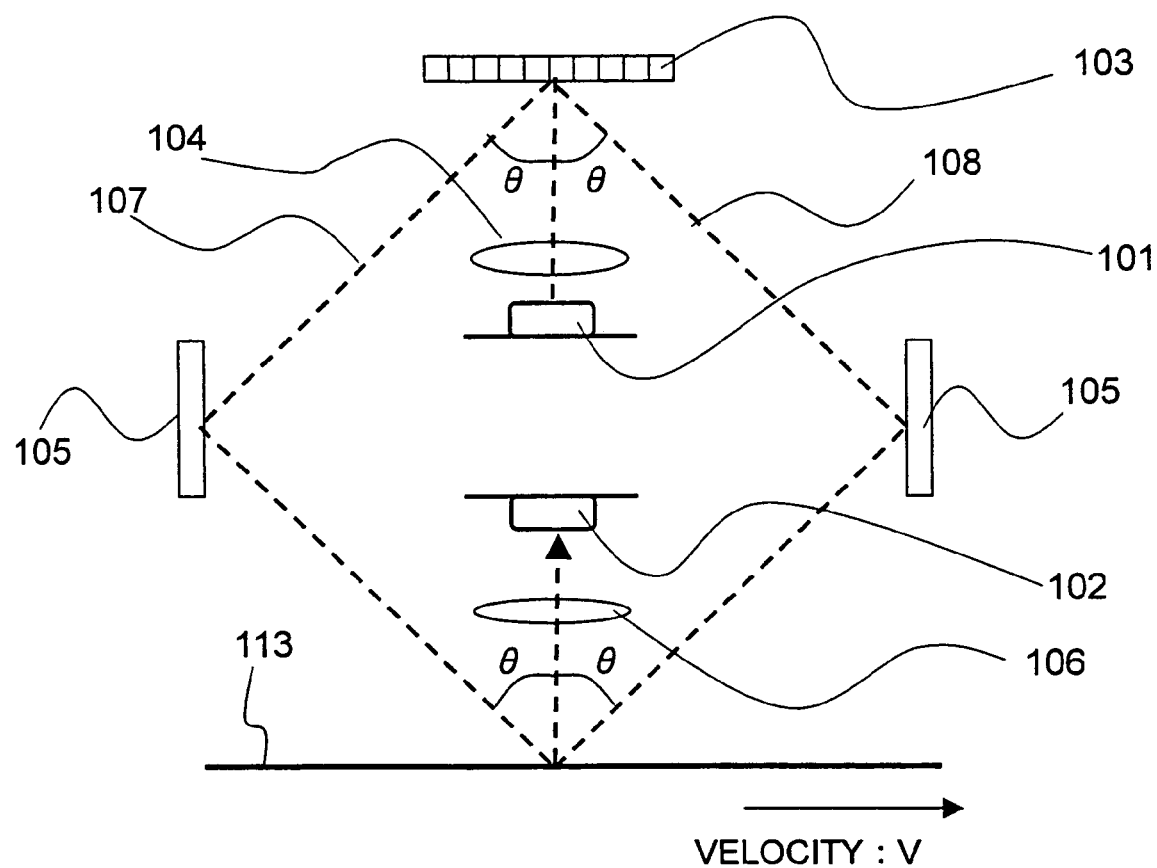
FIG. 13 is a schematic structural view of an essential part of a conventional LDV.
Figure 14:
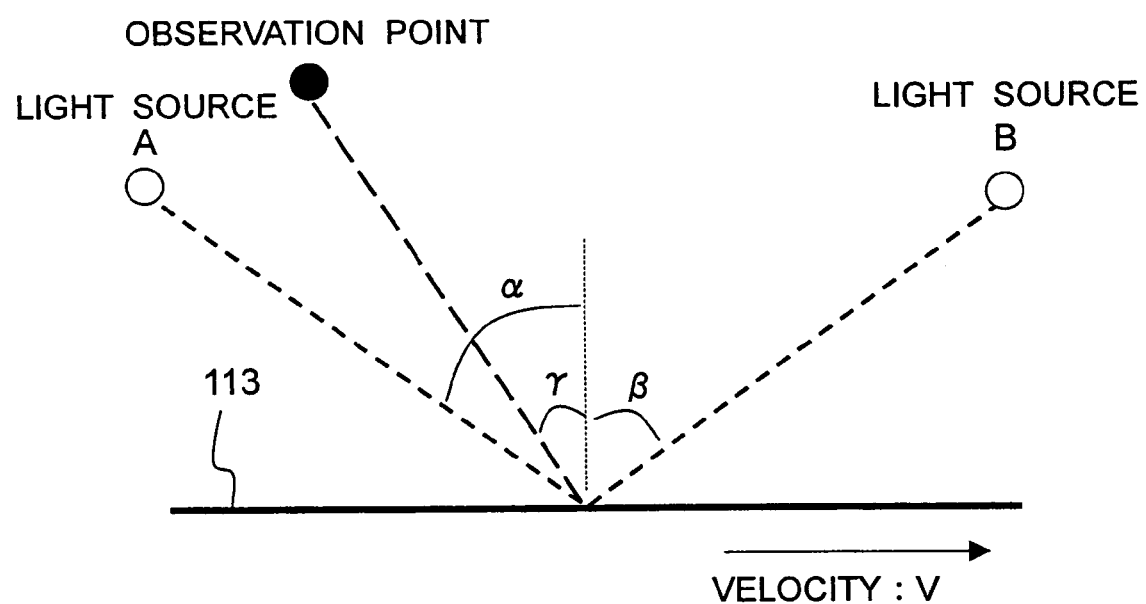
FIG. 14 is an enlarged view of a state in which light fluxes intersect each other in the vicinity of a detection point of the conventional LDV.
Figure 15:
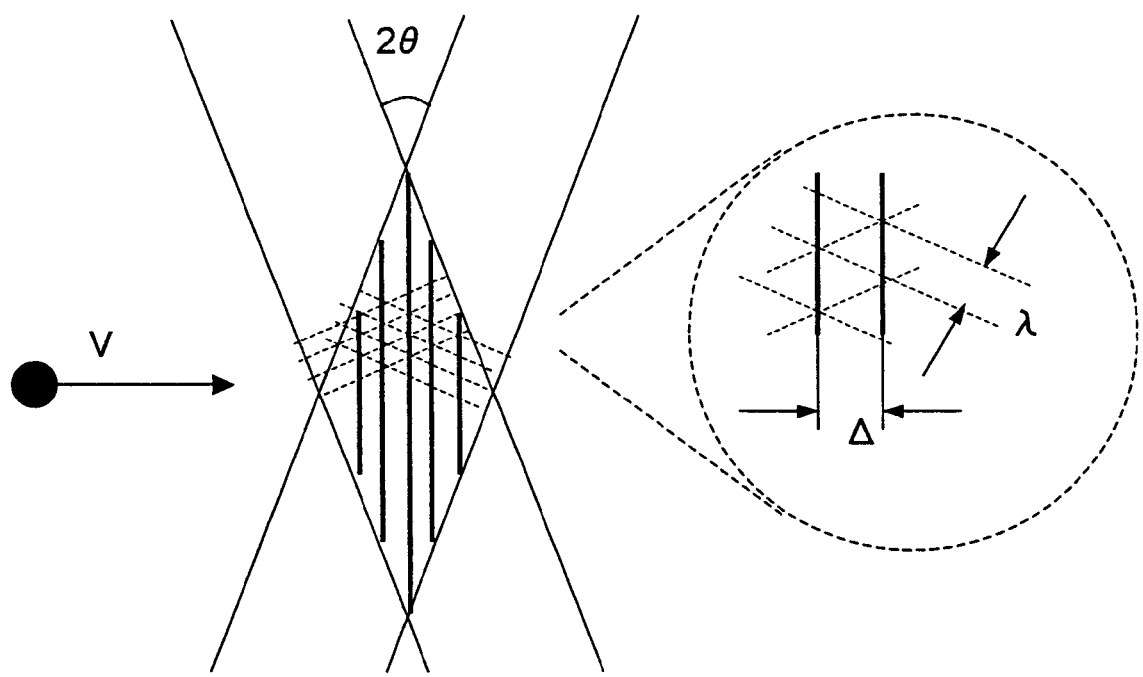
FIG. 15 is an explanatory view explaining an equation which relates a travel velocity of a measured object to Doppler shift frequency.
Figure 16:
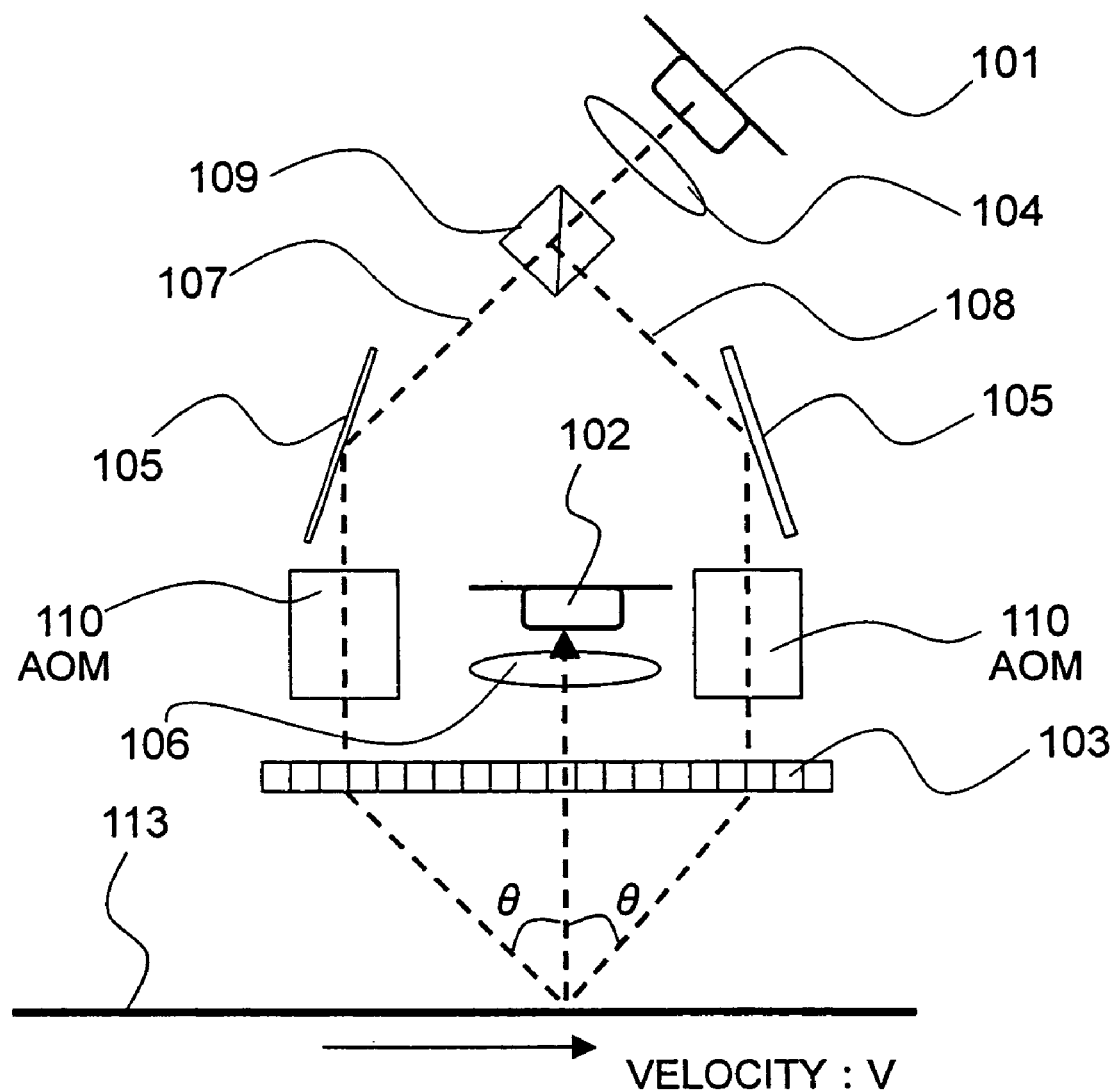
FIG. 16 is a schematic structural view of an essential part of another conventional LDV.

A housing in which the respective optical components and a light-emitting element 30 are contained can have a structure (not shown) similar to the structure of the first embodiment, and can also integrate the optical components in an optical block 55 as shown in FIGS. 12A and 12B so that setting accuracy is improved. The respective optical components are arranged on each face of the optical block 55 in FIG. 12A, and in FIG. 12B, a notched portion 57 is formed in the optical block 55 to dispose the λ/4 plate 16 therein so that the arrangement error of the wavelength plate is reduced and detection accuracy is further improved.

It is to be noted that in both of the first embodiment and the second embodiment, although difference is generated in the intensities of the respective scattered lights to detect the beat signal according to the positions of the light-receiving sections 31 and 32, if the arrangement of the light-receiving sections 31 and 32 are fixed, the scattered light intensities can be almost equal to each other by optimizing the structure (groove depth, groove inclination angle and groove duty ratio) of the diffraction grating 20 on which the light emitted from the LD 30 is incident so as to regulate diffraction efficiency with the result that a S/N of a signal is improved.

Third Embodiment

Although not shown, the displacement information measurement device of the present invention includes the optical velocimeter, and measures displacement information of the measured object based on the velocity information and time information regarding the measured object. Since the displacement information measurement device includes the optical velocimeter, accurate displacement amount is easily measured.

Fourth Embodiment

Although not shown, a conveying and processing device of the present invention includes the optical velocimeter, a carrying section for carrying the measured object and a processing section for applying a prescribed process to the measured object, and applies the prescribed process to the measured object by controlling conveying of the measured object based on the velocity information or displacement information obtained from the optical velocimeter. Since this conveying and processing device includes the optical velocimeter, the conveying and processing device realizes a highly precise conveying and processing. This conveying and processing device is employed for printers, copiers and the like, for example.

It is to be noted that the optical velocimeter is also employed as a motion sensor such as a highly precise encoder by counting the waveform of a beat signal. Also, the velocimeter can be used for control systems of various precision instruments. Furthermore, optical mice, which have been popularized, recognize travel information from a scattered light pattern on a detection surface as picture by an image sensor to detect a travel amount. It is possible for the velocimeter to be applied to optical mice, imaging devices, pointing devices such as a touch point and electronic pens for imputing characters and operations. Thus, the velocimeters in both of the embodiments are applicable to displacement meters for detecting displacement and vibrometers.

Although the present invention has been described, it will be obvious that various changes may be made to the present invention. Such changes which may be obvious to those skilled in the art should not been considered to be departing from the spirit and scope of the present invention, and should be considered to be within the scope of the following claims.

What is claimed is:

1. An optical velocimeter comprising:
a light-emitting element for emitting coherent light;
a light branch section for branching light emitted from the light-emitting element into at least three light fluxes;
an optical system for intersecting on a measured object optical axes of the respective light fluxes branched by the light branch section one another to form one detection point;
at least two light-receiving sections for receiving scattered light frequency-shifted by travel of the measured object from the detection point, wherein the number of light-receiving sections is greater than the number of light-emitting elements; and
a signal processing circuit for processing light-reception signals outputted from the at least two light-receiving sections to detect at least two directions of traveling velocity of the measured object, wherein:
the light fluxes for forming the detection point are three light fluxes which are a first light flux, a second light flux and a third light flux;
the optical system includes a deflection section for deflecting optical axes of the second light flux and the third light flux, and a polarization state change section for changing polarization state so that at least a polarization state of the first light flux is different from polarization states of the second and third light fluxes;
the light-receiving section has a first light-receiving section for receiving scattered light of the first light flux and scattered light of the second light flux which are different from each other in polarization state, and a second light-receiving section for receiving scattered light of the first light flux and scattered light of the third light flux which are different from each other in polarization state;
the first light-receiving section and the second light-receiving section respectively include a dividing section for dividing incident scattered light into two, and two photodetectors for respectively receiving the divided scattered lights divided by the dividing section through mutually orthogonal polarizers; and
the signal processing circuit determines travel direction of the measured object and detects two-dimensional travel velocity of the measured object based on two light-reception signals having difference in phase caused by difference of polarization states obtained by the two photodetectors of the respective light-receiving sections.

2. An optical velocimeter comprising:
a light-emitting element for emitting coherent light;
a light branch section for branching light emitted from the light-emitting element into at least three light fluxes;
an optical system for intersecting on a measured object optical axes of the respective light fluxes branched by the light branch section one another to form one detection point;
at least two light-receiving sections for receiving scattered light frequency-shifted by travel of the measured object from the detection point; and
a signal processing circuit for processing light-reception signals outputted from the at least two light-receiving sections to detect at least two directions of traveling velocity of the measured object;
wherein:
the light fluxes for forming the detection point are three light fluxes which are a first light flux, a second light flux and a third light flux;
the optical system includes a deflection section for deflecting optical axes of the second light flux and the third light flux, and a polarization state change section for changing polarization state so that at least a polarization state of the first light flux is different from polarization states of the second and third light fluxes;
the light-receiving section has a first light-receiving section for receiving scattered light of the first light flux and scattered light of the second light flux which are different from each other in polarization state, and a second light-receiving section for receiving scattered light of the first light flux and scattered light of the third light flux which are different from each other in polarization state;

the first light-receiving section and the second light-receiving section respectively include a dividing section for dividing incident scattered light into two, and two photodetectors for respectively receiving the divided scattered lights divided by the dividing section through mutually orthogonal polarizers; and the signal processing circuit determines travel direction of the measured object and detects two-dimensional travel velocity of the measured object based on two light-reception signals having difference in phase caused by difference of polarization states obtained by the two photodetectors of the respective light-receiving sections.

3. An optical velocimeter as set forth in claim 2, wherein the polarization state change section includes a λ/4 plate for changing a polarization state of the first light flux.

4. An optical velocimeter as set forth in claim 2, wherein the polarization state change section includes a λ/4 plate for changing a polarization state of the first light flux, and a λ/2 plate for changing a polarization state of either one of the second light flux and the third light flux.

5. An optical velocimeter as set forth in claim 2, wherein the polarization state change section includes a λ/4 plate for changing a polarization state of the second light flux, and a X/4 plate for changing a polarization state of the third light flux.

6. An optical velocimeter as set forth in claim 2, wherein the polarization state change section includes a λ/4 plate for changing a polarization state of the second light flux, and a λ/4 plate for changing a polarization state of the third light flux so that the changed polarization state of the third light flux is shifted away by $\pi$ with respect to a phase of the second light flux of which a polarization state is changed.

7. An optical velocimeter as set forth in claim 2, wherein there is provided an optical block integrating the light branch section, the deflection section and the polarization state change section into one body.

8. An optical velocimeter as set forth in claim 7, wherein the polarization state change section is arranged in a notched portion provided in the optical block so that the polarization state change section is perpendicular to an optical axis of an incident light flux thereof.

9. An optical velocimeter as set forth in claim 2, wherein two photodetectors of the respective light-receiving sections are disposed in one chip.

10. An optical velocimeter as set forth in claim 9, wherein the two photodetector are divided-type photodetectors.

11. An optical velocimeter as set forth in claim 2, wherein the respective light-receiving sections are light-receiving sections with built-in signal processing circuit which combines the photodetector with the signal processing circuit.

* * * * *